(12) United States Patent
Krause

(10) Patent No.: US 7,688,889 B2
(45) Date of Patent: Mar. 30, 2010

(54) METHODS, APPARATUS, AND SYSTEMS FOR INSERTION OF OVERLAY CONTENT INTO A VIDEO SIGNAL WITH TRANSRATING CAPABILITIES

(75) Inventor: Edward A. Krause, San Mateo, CA (US)

(73) Assignee: RGB Networks, Inc., Sunnyvale, CA (US)

( * ) Notice: Subject to any disclaimer, the term of this patent is extended or adjusted under 35 U.S.C. 154(b) by 0 days.

(21) Appl. No.: 11/881,366

(22) Filed: Jul. 25, 2007

(65) Prior Publication Data

US 2008/0068500 A1 Mar. 20, 2008

Related U.S. Application Data

(60) Provisional application No. 60/845,707, filed on Sep. 18, 2006.

(51) Int. Cl.
*H04N 7/12* (2006.01)
*H04N 11/02* (2006.01)
*H04N 11/04* (2006.01)

(52) U.S. Cl. ............... 375/240.01; 375/240.25; 375/240.26

(58) Field of Classification Search ............... 375/240.25–240.27; 348/584–589
See application file for complete search history.

(56) References Cited

U.S. PATENT DOCUMENTS

| 5,870,087 | A | * | 2/1999 | Chau | 715/202 |
|---|---|---|---|---|---|
| 5,969,768 | A | * | 10/1999 | Boyce et al. | 348/565 |
| 6,061,099 | A | | 5/2000 | Hostetler | |
| 6,097,442 | A | * | 8/2000 | Rumreich et al. | 348/563 |
| 6,175,388 | B1 | * | 1/2001 | Knox et al. | 348/569 |
| 6,226,328 | B1 | * | 5/2001 | Assuncao | 375/240.26 |
| 6,295,094 | B1 | * | 9/2001 | Cuccia | 348/559 |
| 6,310,657 | B1 | * | 10/2001 | Chauvel et al. | 348/569 |
| 6,434,197 | B1 | | 8/2002 | Wang et al. | |
| 6,727,886 | B1 | * | 4/2004 | Mielekamp et al. | 345/157 |
| 6,850,252 | B1 | | 2/2005 | Hoffberg | |
| 7,046,677 | B2 | | 5/2006 | Monta et al. | |
| 7,324,161 | B2 | * | 1/2008 | Hwang | 348/569 |
| 7,391,809 | B2 | | 6/2008 | Li et al. | |
| 2002/0061184 | A1 | * | 5/2002 | Miyamoto | 386/68 |
| 2002/0110193 | A1 | | 8/2002 | Yoo et al. | |

(Continued)

OTHER PUBLICATIONS

Leon, Orlando, 'An Extensible Communication-Oriented Routing Environment for Pervasive Computing', Massachusetts Institute of Technology, Department of Electrical Engineering and Computer Science, Masters Thesis, May 24, 2002. [retrieved on Feb. 15, 2003]. Retrieved from the Internet: < URL: http://org.csail.mit.edu/pubs/theses/leon/leon-thesis.pdf>.

*Primary Examiner*—Marsha D Banks Harold
*Assistant Examiner*—Chikaodili E Anyikire
(74) *Attorney, Agent, or Firm*—Lipsitz & McAllister, LLC

(57) ABSTRACT

Methods, apparatus, and systems for inserting overlay content into a video signal are provided. An overlay content signal containing overlay content is received. In addition, a compressed video signal is received from a video source and decoded. An insertion window portion of the decoded video signal is identified. The overlay content signal and the insertion window portion of the decoded video signal are processed to produce a modified insertion window portion of the video signal. The video signal and the modified insertion window portion are then processed to produce a modified video signal. The data rate of the video signal may be modified during the overlay content insertion process.

36 Claims, 11 Drawing Sheets

U.S. PATENT DOCUMENTS

| | | | |
|---|---|---|---|
| 2002/0176495 A1* | 11/2002 | Vetro et al. | 375/240.02 |
| 2002/0176508 A1* | 11/2002 | Boyce et al. | 375/240.25 |
| 2003/0220835 A1 | 11/2003 | Barnes, Jr. | |
| 2004/0179597 A1* | 9/2004 | Rault | 375/240.08 |
| 2004/0252982 A1* | 12/2004 | Iwahara et al. | 386/111 |
| 2004/0268401 A1 | 12/2004 | Gray et al. | |
| 2007/0250896 A1* | 10/2007 | Parker et al. | 725/135 |
| 2007/0297507 A1* | 12/2007 | Kim | 375/240.03 |
| 2008/0056354 A1* | 3/2008 | Sun et al. | 375/240.12 |

* cited by examiner

METHODS, APPARATUS, AND SYSTEMS FOR INSERTION OF OVERLAY CONTENT INTO A VIDEO SIGNAL WITH TRANSRATING CAPABILITIES

This application claims the benefit of U.S. Provisional Application No. 60/845,707, filed Sep. 18, 2006, which is incorporated herein and made a part hereof by reference.

BACKGROUND

The present invention relates to the field of video processing. More particularly, the present invention provides methods, apparatus, and systems for insertion of overlay content into a video signal. In addition, certain example embodiments of the invention are directed towards insertion of overlay content into a video signal during transrating of the video signal.

Today's television images are frequently overlayed with additional content (referred to herein as "overlay content"), such as text messages, logos, animations, or sub-windows featuring full-motion video. Such edited signals are useful for conveying emergency information, targeted advertisements, or for customizing the message associated with a full-screen program or advertisement. There may be more than one candidate overlay content available for insertion into a particular video stream at a particular time. Although equipment for inserting or overlaying new content into full-screen video is readily available, such equipment is typically designed to operate with uncompressed video signals, and is purpose-driven for only those applications.

Encoded video signals based on compression standards such as MPEG present special challenges to the video editing process. A prior art system for inserting overlay content into a video signal is shown in FIG. 1. In the prior art, a decoder 10 fully decodes the video signals before the overlay content (auxiliary video) is inserted at a video editor 12. The modified video signal from the video editor 12 is then re-encoded at encoder 14 before being forwarded to the final destination. Not only is this solution expensive, but it can also degrade the quality of the video. For example, it is not uncommon to choose an expensive high-quality encoder for the original encoding process, and then economize on the cost of additional hardware if needed to process the signal in the smaller cable head-ends or other distribution sites serving a more limited audience.

Although it is possible to directly modify the video signal without using separate decoders, editors, and encoders, multiple problems need to be solved. For example, compression standards such as MPEG-2 and H.264 use motion compensation to predict the movement of features from one video frame to another. However, if one of these frames is altered by inserting or overlaying a different video image, then the synchronization between the decoder and the original encoder is destroyed. As a result, the motion prediction process will fail if a region of the image is encoded using a motion vector which crosses the boundary between the modified and unmodified regions of the image.

It would be advantageous to provide a simplified way to manage the insertion of overlay content into a video signal. In particular, it would be advantageous to enable overlay content to be closely correlated with a video signal into which the overlay content is to be inserted and/or with a video signal in a particular geographic region. It would also be advantageous to enable such close correlation between the overlay content and the video signal using tags with identifying information appended to the overlay content and/or the video signals. It would be further advantageous to enable the modification of compressed video signals with overlay content without the use of decoders and encoders. This results in considerable cost savings particularly when a large number of streams need to be processed. In addition, it would be advantageous to enable modification of the compression ratio of the video signal using the same insertion and overlay apparatus.

The methods, apparatus, and systems of the present invention provide the foregoing and other advantages. In particular, the present invention is particularly advantageous when combined with advanced transrating systems, such as the statistical multiplexers used in cable and other video distribution centers.

SUMMARY OF THE INVENTION

The present invention provides methods, apparatus, and systems for the insertion of overlay content into a video signal. In addition, certain example embodiments of the invention are directed towards insertion of overlay content into a video signal during transrating of the video signal.

In one example embodiment of the present invention, an overlay content signal containing overlay content is received. In addition, a compressed video signal is received from a video source and decoded. An insertion window portion of the decoded video signal is identified. The overlay content signal and the insertion window portion of the decoded video signal are processed to produce a modified insertion window portion of the video signal. The video signal and the modified insertion window portion are then processed to produce a modified video signal.

In a further example embodiment of the present invention, the data rate of the video signal may be modified during the overlay content insertion process. A closed-loop transrating path may be provided for modifying a data rate of the video signal. In addition, an open-loop transrating path may also be provided for modifying the data rate of the video signal. The closed-loop transrating path may be selected for modifying the data rate of the insertion window portion of the video signal.

Pixel quantization error control may be provided in the closed loop transrating path. The pixel quantization error control may comprise obtaining errors from the quantization of transform coefficients of incoming pixels of the video signal in the form of error transform coefficients. An inverse transformation process may be performed on the error transform coefficients to provide pixel errors in the pixel domain. These pixel errors may be stored and then retrieved during modification of the data rate of associated pixels. The pixel errors may be added to the incoming pixels obtained from an inverse transformation process to obtain corrected pixels in order to prevent accumulation of requantization artifacts during the quantization of transform coefficients corresponding to the incoming pixels. A transformation process may be performed on the corrected pixels to provide error corrected transform coefficients for the quantization.

The closed-loop transrating path may be selected for modifying the data rate of I-frames and P-frames of the video signal. The open-loop transrating path may be selected for modifying the data rate of B-frames of the video signal. In general, it is advantageous to use the closed-loop transrating path for modifying the data rate of the reference frames. These are the pictures which may be used to predict other pictures. In the case of MPEG-1 and MPEG-2, the reference frames are the I-frames and P-frames.

The closed-loop transrating path and the open loop transrating path may be operable simultaneously. For example, the same system can be used to process multiple video streams, and in this case, it is possible to keep each of the open and closed loop processors busy by allocating a frame from any of the video streams for which a next frame is available. The closed-loop transrating path may be selected for modifying the data rate of I-frames and P-frames of the various video signals and the open-loop transrating path may be selected for modifying the data rate of B-frames of the various video signals.

In some instances, both of the open-loop transrating path and the closed loop transrating path may be available for processing I-frames and P-frames of the video signals. Similarly, both of the open-loop transrating path and the closed loop transrating path may be available for processing B-frames of the video signals.

An additional open-loop transrating path may be provided for modifying the data rate of the video signals. The two open-loop transrating paths and the closed-loop transrating path may be operable simultaneously. Those skilled in the art will appreciate that additional open- or closed-loop transrating paths may be provided, as desired, in order to increase the processing speed of the system.

The open-loop transrating path may comprise; variable length decoding of the video signal to provide quantized transform coefficients; performing an inverse quantization operation on the transform coefficients to scale the transform coefficients; performing a quantization operation on the scaled transform coefficients to re-scale the transform coefficients to achieve a desired data rate; and variable length encoding of the re-scaled transform coefficients to provide a video signal at the desired data rate.

In another example embodiment of the present invention, at least one of an obscured processing mode and an insert processing mode may be provided for carrying out the processing steps. The obscured processing mode may be operable for processing an obscured region of the video signal in which motion vectors of a current pixel block of the video signal reference a portion of the insertion window. The insert processing mode may be operable for the processing of the overlay content signal and the insertion window portion of the video signal to produce the modified insertion window portion.

In addition, a normal processing mode may be provided for processing the video signal when the video signal does not contain an insertion widow. The normal processing mode may comprise: variable length decoding of the video signal to provide quantized transform coefficients; performing an inverse quantization operation on the transform coefficients to scale the transform coefficients; performing an inverse transformation process on the scaled transform coefficients to convert the scaled transform coefficients into pixel values; summing the pixel values with motion-compensated pixel errors to provide error-compensated pixel values; performing a transformation process on the error-compensated pixel values to produce error-compensated transform coefficients; performing a quantization operation on the error-compensated transform coefficients to re-scale the transform coefficients to achieve a desired data rate; and variable length encoding of the re-scaled transform coefficients to provide a video signal at the desired data rate.

The motion-compensated pixel errors may be obtained by: obtaining errors from the quantization operation in the form of pixel errors and storing the pixel errors. The stored pixel errors may be retrieved when performing a motion compensation operation on associated pixels. The pixel errors and associated pixels may then be processed to provide the motion-compensated pixel errors. The summing of the pixel values with the motion-compensated pixel errors prior to the transformation process prevents accumulation of requantization artifacts during the quantization operation.

A limited processing mode may be provided for carrying out at least one of the processing steps when the obscured processing mode, the insert processing mode, and/or the normal processing mode are not selected. The limited processing mode may comprise: variable length decoding of the video signal to provide quantized transform coefficients; performing an inverse quantization operation on the transform coefficients to scale the transform coefficients; performing a quantization operation on the scaled transform coefficients to re-scale the transform coefficients to achieve a desired data rate; variable length encoding of the re-scaled transform coefficients to provide a video signal at the desired data rate; performing an inverse transformation process on the scaled transform coefficients to convert the scaled transform coefficients into pixel values; adding the pixel values to motion compensated pixels retrieved from pixel memory to obtain decoded pixel values; and storing the decoded pixel values.

The obscured processing mode may comprise: variable length decoding of the obscured region of the video signal to provide quantized transform coefficients; performing an inverse quantization operation on the transform coefficients to scale the transform coefficients; performing an inverse transformation process on the scaled transform coefficients to convert the scaled transform coefficients into pixel values; adding the pixel values to motion compensated pixels retrieved from pixel memory to obtain decoded pixel values; storing the decoded pixel values; and processing the decoded pixel values to modify the current pixel block such that the current pixel block does not require reference to any portion of the insertion window of the video signal for decoding.

The processing of the decoded pixel values may comprise: performing a transformation process on the decoded pixel values to reproduce the scaled transform coefficients; performing a quantization operation on the scaled transform coefficients to re-scale the transform coefficients to achieve a desired data rate; and variable length encoding of the re-scaled transform coefficients to provide an intra coded pixel block in place of the current pixel block at the desired data rate.

Alternatively, the processing of the stored decoded pixel values may comprise: performing a motion compensation operation on the stored decoded pixel values to reconstruct the obscured region of the video signal; performing a transformation process on the motion compensated pixel values to reproduce the scaled transform coefficients; performing a quantization operation on the scaled transform coefficients to re-scale the transform coefficients to achieve a desired data rate; and variable length encoding of the re-scaled transform coefficients using motion vectors from the motion compensation operation to provide a modified pixel block in the video signal in place of the current pixel block at the desired data rate.

The insert processing mode may comprise: variable length decoding of the insertion window portion of the video signal to provide quantized transform coefficients; performing an inverse quantization operation on the transform coefficients to scale the transform coefficients; performing an inverse transformation process on the scaled transform coefficients to convert the scaled transform coefficients into pixel values corresponding to the insertion window portion; adding the pixel values to motion compensated pixels retrieved from pixel memory to obtain decoded pixel values; storing the decoded pixel values corresponding to the insertion window portion; combining pre-stored pixel values corresponding to the overlay content with at least a portion of the stored decoded pixel values corresponding to the insertion window portion to provide modified decoded pixel values; performing a transformation process on the modified decoded pixel values to provide modified scaled transform coefficients; performing a quantization operation on the modified scaled transform coefficients to re-scale the modified transform coefficients to achieve a desired data rate; and variable length encoding of the re-scaled modified transform coefficients to provide the modified video signal at the desired data rate.

The pre-stored pixel values corresponding to the overlay content may be obtained by: variable length decoding of the overlay content signal to provide quantized transform coefficients corresponding to the overlay content; performing an inverse quantization operation on the transform coefficients corresponding to the overlay content to scale the transform coefficients; performing an inverse transformation process on the scaled transform coefficients to convert the scaled transform coefficients into pixel values corresponding to the overlay content; and storing the pixel values corresponding to the overlay content to obtain the pre-stored pixel values.

The processing may transition from the normal processing mode to the insert processing mode when inserting the overlay content into the video signal. Transitioning from the normal processing mode to the insert processing mode may comprise: waiting to receive an I-frame in the video signal; switching from the normal processing mode to the limited processing mode; waiting to receive a next reference frame in a current portion of the video signal; setting a window-mode to "on" enabling an insertion window in the video signal; switching to the insert processing mode when processing a region of the video signal corresponding to the insertion window; switching to the obscured processing mode when processing regions of the video signal external to the insertion window portion if motion vectors corresponding to the external regions reference the insertion window portion in a previously decoded frame; and switching to the limited processing mode otherwise.

The process may also transition back to the normal processing mode after completing an insertion of overlay content. Transitioning to the normal processing mode may comprise: waiting to receive a reference frame; setting a prime-mode to "on" initiating a resetting of a memory used to process the reference frame; setting a window-mode to "off" to prevent creation of an insertion window in a current portion of the video signal; waiting for a next frame of the video signal; determining if the next frame is a B-frame or other picture type to be displayed before the received reference frame; (a) if the next frame is a B-frame: setting the window-mode to "on" enabling the insertion window in the video signal; and waiting for further frames after the next frame until a next reference frame is received; or (b) if the next frame is not a B-frame: setting the window-mode to "off"; setting the prime mode to "off"; and switching to the normal processing mode.

A pixel combiner may be provided along with a first and second multiplexer. The first multiplexer may be provided for selecting at least one of the transform coefficients from the inverse quantization operation or a signal from the pixel combiner. The second multiplexer may be provided for selecting at least one of the pixel errors from the quantization operation or the signal from the pixel combiner. The signal from the pixel combiner may comprise at least one of stored overlay content pixels or main video content pixels obtained from processing of the video signal.

An overlay controller may be provided for controlling at least one of the first multiplexer, the second multiplexer, the pixel combiner, and the motion compensation operation. A synchronizing signal may be provided for synchronizing operation of the first multiplexer, the second multiplexer, the pixel combiner, and the motion compensation operation.

The processing of the overlay content signal and the insertion window portion of the decoded video signal to produce the modified insertion window portion of the video signal may comprise: processing the insertion window portion of the video signal to obtain a corresponding first set of absolute pixel values; storing the first set of absolute pixel values corresponding to the insertion window portion; processing the overlay content signal to obtain a corresponding second set of absolute pixel values corresponding to the overlay content; and storing the second set of absolute values corresponding to the overlay content, such that the modified insertion window portion is produced by processing the first and second set of absolute pixel values.

The overlay content may be inserted into the video signal in place of the insertion window portion of the video signal to produce the modified insertion window portion. Alternatively, the overlay content may be blended with the insertion window portion of the video signal to produce the modified insertion window portion.

Different overlay content may be provided in one or more overlay content signals. A tag may be appended to at least one of: (a) the video signal; and (b) at least one of the one or more overlay content signals. The tag may contain identifying information. The overlay content may be selected for the inserting from one of the one or more overlay content signals in accordance with the identifying information.

Methods, apparatus and systems corresponding to the above-described embodiments are encompassed by the present invention.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention provides methods, apparatus, and systems for insertion of overlay content into a video signal. In addition, certain example embodiments of the invention are directed towards insertion of overlay content into a video signal during transrating of the video signal.

Figure 1:
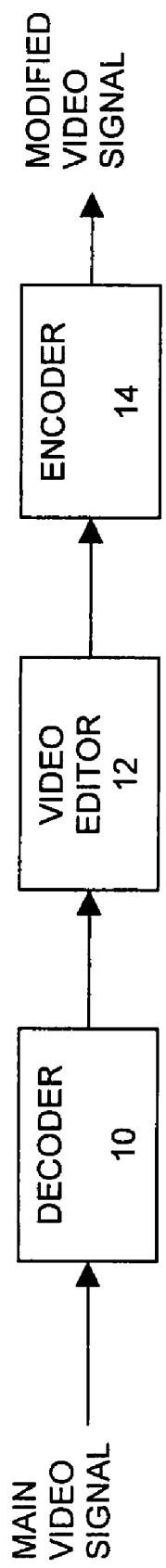
FIG. 1 shows a block diagram of a prior art system for inserting overlay content into a video signal.
Figure 2:
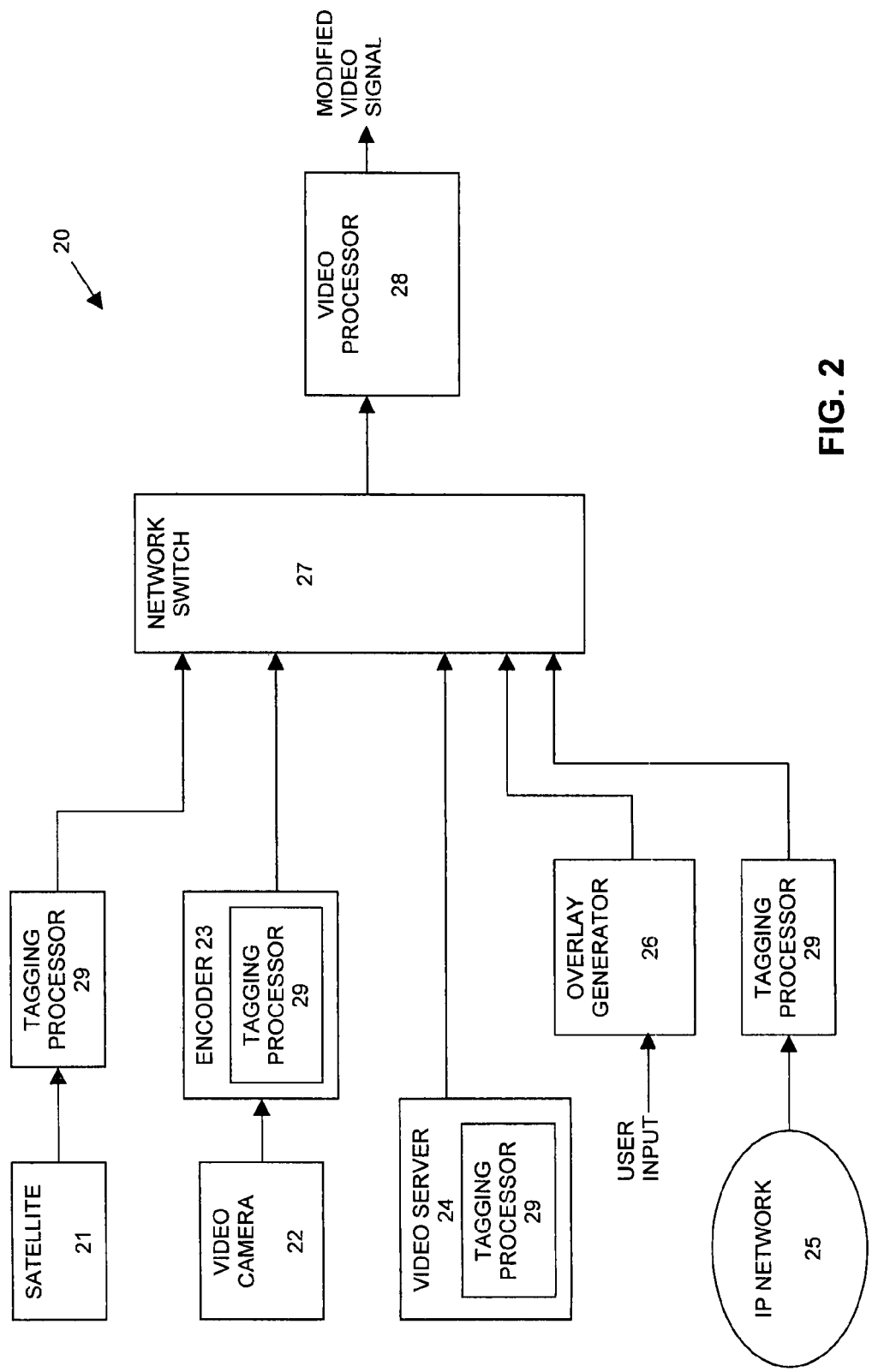
FIG. 2 shows a block diagram of an example embodiment of a system for inserting overlay content into a video signal in accordance with the present invention.

A simple block diagram of an example embodiment of a video processing system 20 with insertion and overlay capabilities in accordance with the present invention is shown in FIG. 2. In this example, video signals are received from one or more video sources, such as, for example, a satellite 21, a video camera 22 coupled to a video encoder 23, video storage devices/servers 24, an IP network 25, or the like. The overlay content signal to be inserted into the incoming video signals is created by an overlay content generator 26, for example using information provided from a console for user input. As an example, the overlay content generator 26 and user console may be a PC installed with software for generating text, graphic features, or more general video content. In such an example, the PC may also include software or hardware for encoding the rendered video to a suitable compression format. The insertion or overlaying of content into the main video signal is implemented by a video processor 28 which receives the video signals and overlay content signals via a network switch 27 or other suitable mechanism.

In order to manage which overlay content is inserted into which video signal at the video processor 28, a tag is appended to at least one of: (a) the video signal; and (b) at least one of the one or more overlay content signals. The tag contains identifying information for use in matching overlay content to an appropriate video signal. The video processor 28 is then able to select overlay content from one of the overlay content signals and insert the selected overlay content into the video signal in accordance with the identifying information to produce a modified video content.

The tag may be appended to the overlay content signal by the overlay generator 26. A tag may be appended to each incoming video signal by a tagging processor 29 at the video source (e.g., at satellite 21, a video camera 22 coupled to a video encoder 23, video storage devices (servers) 24, or IP network 25). The tagging processor 29 may be implemented as part of the encoding device at the video source (e.g., as part of encoder 23 or video server 24) or as a separate device (e.g., downstream from IP network 25 or satellite 21).

The appended tags could be inserted into the headers of elementary video or audio streams or they could be multiplexed into a packetized stream consisting of multiple video, audio, and data streams corresponding to one or more programs. In this case, the header information could be encapsulated into one or more packets and assigned a unique packet identifier (PID). In the case of MPEG-2 transport streams, packets types and program correspondences are determined by matching these PIDs with entries listed in special packets known as Program Association Tables (PAT) and Program Map Tables (PMT) included in the same multiplexed stream.

In a further example embodiment, a tag may be appended to both the video signal and each of the one or more overlay content signals. The video processor 28 may select overlay content from one of the overlay content signals by extracting the tags from the video signal and each of the one or more overlay content signals, comparing the tag from the video signal with each tag from the overlay content signals, and selecting for insertion the overlay content from the overlay content signal which has the tag that is a best match to the tag extracted from the video signal.

The identifying information contained in the tag may comprise at least one of: geographic information identifying the geographic region where the overlay content is to be inserted into the video signal; a downlink control device identifier; a destination QAM; a channel number; an insertion start time; a duration of overlay content; an insertion identifier; an insertion window position; an insertion window size; a classification identifier; blending information; key words to enable matching of the overlay content with the video signal; or the like.

For example, a tag with an insertion identifier may be appended to the video signal and used to match the video signal with specific overlay content signal that the video processor 28 should have already received. The video processor 28 would identify this overlay content signal by matching keywords in the overlay content signal tag with the insertion identifier contained in the tag appended to the video signal.

Geographic information such as zip codes, a downlink control device IDs, destination QAMs, channel numbers, and the like may be included in the tags to enable better targeted insertion of overlay content, e.g., for advertisements. Content descriptors may also be included in the tags which may include at least one of format information (text, still picture, MPEG2, MPEG4 video, audio types, and the like) and corresponding component descriptors. In addition, text component descriptors may be provided which may include at least one of list position, speed, font, etc. Further, the tags may include video component descriptors which may include at least one of resolution, position, moving speed for animation, etc. Audio descriptors may be provided which may indicate a policy to replace main audio (which is usually not desired).

The blending information may comprise information to enable alpha blending of the overlay content with a corresponding portion of the video signal to obtain a modified video signal containing the overlay content.

The classification identifier may be used to assist the video processor 28 in selecting the most suitable overlay content to insert into a video signal at a particular time and position within the video signal or frame of the video signal. It is a parameter that could be interpreted as a subject classification pertaining to the video signal at the specified time, or it could be interpreted as a more general screening filter conveying information such as the priority of the existing window, the characteristics of the window background, a destination QAM, a destination channel, or a downlink control device. Note that overlay content may or may not include audio and the classification identifier could also specify whether it is permissible to override the audio provided with the main video stream.

The process of selecting a particular overlay content for insertion into a main video program could be implemented by first pre-assigning one or more classification identifiers to the tags for each available overlay content signal. Then, when an opportunity for insertion is signaled by tags in the main video streams, the classification identifier could be extracted from the tag in the main video program and compared with the one or more classification identifiers in each of the available overlay content signals. Any overlay content signal with a matching identifier would contain overlay content suitable for insertion into the main video program.

The classification identifier may comprise at least one of subject information for the video signal, subject information for the overlay content, priority information for an existing insertion window, characteristics of an insertion window, audio override information for the overlay content, a resolution of the overlay content, a channel number, a target program name for insertion of the overlay content, a regional program rating of the target program, a transport identifier for the target program, a format descriptor, a text component descriptor comprising at least one of text position, speed, font size, font type, and font color, and a video component descriptor comprising at least one of a video resolution, a video position, a video speed for animation, or the like.

The selection process can be further optimized in cases where an opportunity for insertion has been signaled, and more than one suitable overlay content signal exists. For example, in addition to pre-assigning one or more classification identifiers to each overlay content signal, "quality of fit" parameters could be pre-assigned to the overlay content signals as well. That is, for each classification identifier, there may be a corresponding quality of fit parameter that is indicative of the relevance of the content to the particular classification. Then, if there are multiple overlay content signals featuring the same classification identifier, and if this identifier matches the one specified in the tag included in a main video stream, then the overlay content signal having the highest corresponding quality of fit parameter would be selected. This method can be used to maximize the efficiency of targeted advertising when using partial screen video insertions.

In an example embodiment using both classification identifiers and quality of fit parameters, a tag may be appended to both the video signal (e.g., at tagging processor 29) and each of the one or more overlay content signals (e.g., at overlay content generator 26). Classification identifiers may be provided as at least part of the identifying information. A corresponding quality of fit parameter may be assigned to the overlay content signal (e.g., at overlay content generator 26) for each classification identifier. The quality of fit parameter may indicate a relative correspondence between each overlay content and the classification identifier. In such an example embodiment, the overlay content signals that have the same classification identifier as the video signal may be identified by the video processor 28. The video processor 28 may then select the overlay content from an identified overlay content signal that has a quality of fit parameter that indicates a highest correspondence to the classification identifier.

The overlay content generator 26 may be located at a central distribution site. The video processor 28 may be located at a location remote from the overlay content generator 26. Multiple video processors 28 may be provided at respective remote locations, such as, for example various downstream sites such as a cable or satellite headend or hub, a telephone company central office or node, or the like. The overlay content signals may be forwarded from the overlay content generator 26 to at least one video processor 28 at a corresponding remote location for storage in advance of the inserting. For example, a video processor 28 may be located at one of a cable headend, a central office, a cable distribution hub, a satellite distribution hub, or the like. In such instances, the identifying information contained in the tags may comprise geographic information. The video processor 28 at a particular remote location may select the overlay content from the overlay content signals having geographic information corresponding to the particular remote location of that video processor 28 for insertion in the video signal. For example, the tag may be used to match the overlay content signal with a particular geographic region. Each video processor 28 could then compare the tag with a pre-assigned region code that is specific to the location of each respective video processor location. In this way, it becomes possible to create a different message for each video processor 28 since the video processors are now able to scan all messages to find the one most suitable for the local audience.

The selection and inserting of the overlay content may occur at the at least one remote location by respective video processors 28 at those locations. Alternatively, the selection and inserting of the overlay content may occur by a video processor 28 at a central location. Multiple copies of the modified video content may then be distributed from the central location to one or more remote locations for further distribution.

The tag may be appended to the overlay content signal by the overlay content generator 26 at the central distribution site. This tag may determine which of the one or more video processors 28 at respective remote locations will insert the overlay content in a particular video stream.

Figure 3:
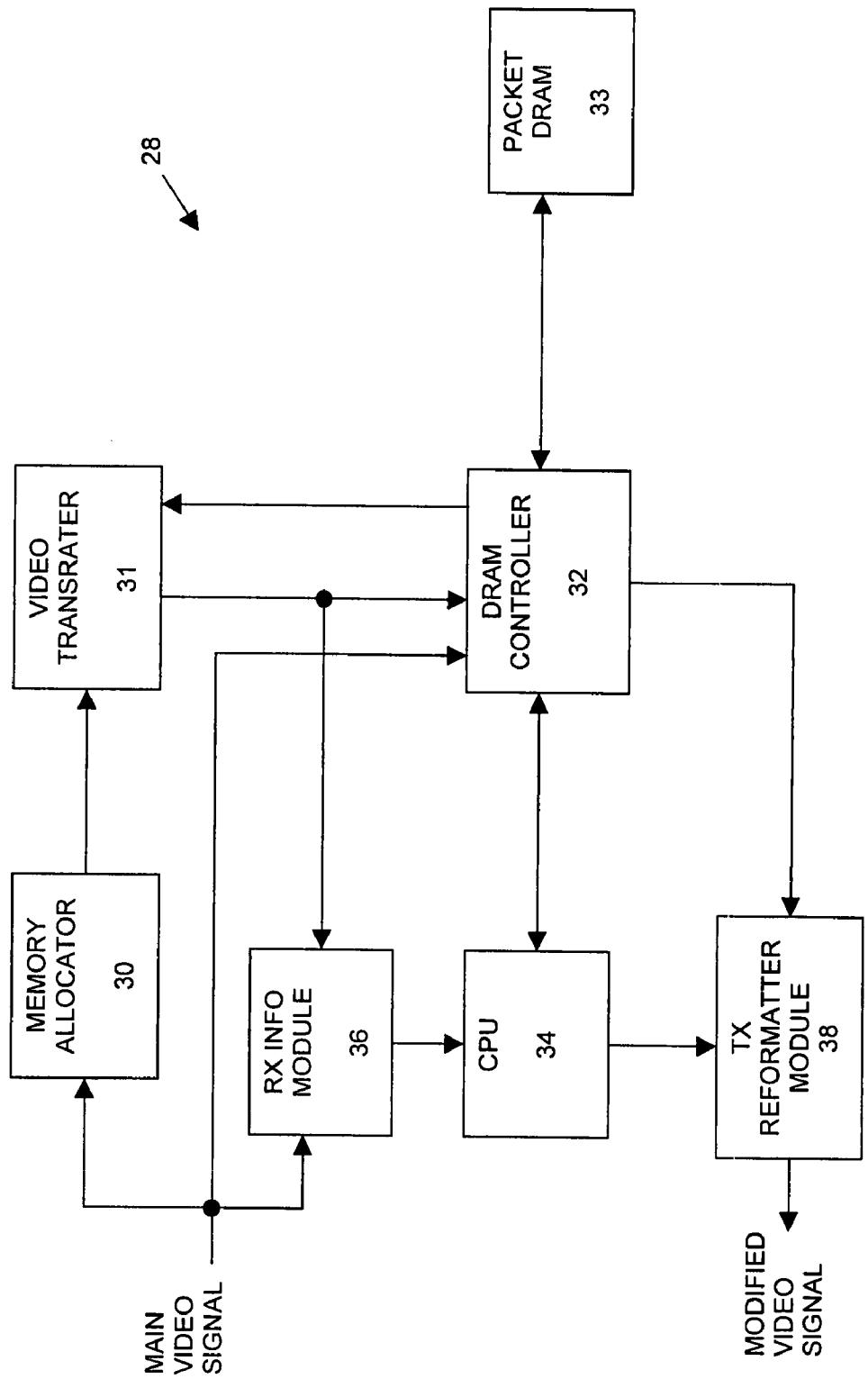
FIG. 3 shows a block diagram of an example embodiment of a video processor in accordance with the present invention.

The video processor may insert the overlay content signal into an insertion window of the video signal in place of a corresponding portion of the video signal. Alternatively, the overlay content may be inserted into an insertion window of the video signal and blended with a corresponding portion of the video signal. Alpha blending may be used to blend the overlay content with a corresponding insertion window portion of the video signal An example embodiment of a video processor 28 in accordance with the present invention is shown in FIG. 3. The example embodiment of a video processor 28 shown in FIG. 3 includes an optional memory allocator 30 and optional video transrater 31 for enabling modification of the data rate of the video stream at the same time as the insertion of overlay content takes place. Those skilled in the art will appreciate that the video processor 28 may be implemented without the transrating capabilities provided by the optional memory allocator 30 and optional video transrater 31 where insertion of overlay content is desired without any modification of the data rate of the resultant modified video stream. Alternatively, the video transrater 31 may be instructed to maintain the original data rate of the video signal.

In an example embodiment where transrating is desired, incoming packets of the video signal (e.g., either video signals from the video sources 21, 22, 24, and/or 25, or the overlay content signals from the overlay content generator 26 of FIG. 2) are scanned by the memory allocator 30 for header information specifying the horizontal and vertical dimensions of the encoded image. This information may be needed by the video transrater 31 if provided with memory for storing one or more images of each incoming video signal. In addition to optional memory space for the individual video signals, transrater 31 also includes memory for the overlay content which is to be inserted or overlayed on top of the video signal. An example of a prior art memory allocator is described in U.S. Pat. No. 7,046,677.

The incoming video packets are not sent directly to the video transrater 31 but are first deposited into packet dram 33 via the dram controller 32. A central processing unit (CPU) 34 is notified of the arrival of each packet by depositing a tag into the rx info module 36, which is in communication with the CPU 34. The tag identifies the packet and the CPU 34 maintains a list matching the address in packet dram 33 with information corresponding to the received packet.

Although the video transrater 31 is capable of processing multiple video streams, they must first be organized into complete frames and multiplexed at the boundaries between frames. The CPU 34 keeps track of the sequence of packets comprising each frame and determines the sequence in which frames are to be forwarded from packet dram 33 to the video transrater 31. The CPU 34 instructs the dram controller 32 to forward the selected packets from packet dram 33 to the video transrater 31 in the desired sequence.

In addition to adjusting the data rate of each stream, the video transrater 31 may also implement the insertions and overlays. The CPU 34 may analyze the identifying information contained in the tags deposited into the rx info module 36 to determine whether a particular video stream has an insertion window available for the insertion of overlay content. Once an insertion opportunity is identified in a particular video stream, the CPU may select a particular overlay content for insertion based on the identifying information contained in the tags of the overlay content and/or the video stream, as discussed in detail above. The CPU 34 may then direct dram controller 32 to provide the appropriate packets from packet dram 33 to the transrater 31. For example, the CPU 34 may direct dram controller 32 to provide the transrater 31 with packets from packet dram 33 corresponding to the overlay content that has been matched with a particular video stream. The transrater 31 may use various alpha blending techniques to blend the overlay content with the corresponding insertion window portion of the video signal.

Those skilled in the art will appreciate that in embodiments where transrating is not required, a suitable processor may be substituted in place of the memory allocator 30 and video transrater 31 for implementing the insertions and overlays.

Once the frames have been processed by the video transrater 31, the resulting sequence of packets (e.g., transrated packets and/or modified packets containing overlay content) is returned to packet dram 33 via the dram controller 32. At the same time, the CPU 34 is notified of each packet transfer. This is done by again depositing the tag into the rx info module 36 so that the CPU 34 again becomes aware of the location of each packet in the packet dram 33. In this case the tag is provided by the transrater 31 to the rx info module 36. If the CPU 34 requires additional information about a particular video stream, then it may submit a request to the dram controller 32 in order to receive the data comprising any selected packet.

The CPU 34 also manages the sequencing and formatting of packets for final output. Statistical multiplexing schemes are easily implemented by managing the transrating process to achieve similar video quality on each stream while utilizing the full capacity of the output channel. The CPU 34 manages the formation of the output multiplex by instructing the dram controller 32 to transfer selected packets from packet dram 33 to the tx reformatter module 38. In this case, the CPU 34 may also have the ability to modify the header (including tags) of each packet as it passes through the tx reformatter module 38.

The pre-conditioning of the video streams or overlay content streams with tags may be done by modifying existing protocols such as the SCTE-30 and SCTE-35 protocols currently used for implementing full screen digital ad insertions.

The same overlay content can be sent with different resolutions if the main video signal is being transmitted with different resolutions at different times. For example, "resolution" can be one of the parameters in determining "quality of fit" or alternatively, different Classification IDs can be assigned for different resolutions.

The same method can be extended for use with DPI (Digital Program Insertion), in a sense that the video transmitted by DPI servers could become the "Main Video" signal during that time window. In such cases, the system which provides the splicing functionality (or DPI server itself) could insert the tags, and classification IDs can be used to insert or overlay content for targeted advertising. In such a way DPI servers can leverage the present invention's capabilities without having to modify ad content itself. This gives the flexibility to a small headend to just overlay or insert on specific portions of ad content, which was originally transmitted by larger headends.

Subject classification pertaining to the main program can leverage from already existing characteristics of a program. For example, ATSC systems can use a combination of parameters available at its disposal, for example major and minor channel number, program name, regional rating of a program, transport IDs and the like.

Targeted advertising can be achieved by inserting an event sponsor's overlay content at a particular time. If an event/segment has many sponsors, subject information can use the same classification ID for all of them but with different "Quality of fit" parameters. Of course "Quality of fit" parameters could be dynamically changed if an application wants to rotate among the inserted overlay content of all the sponsors at different times.

Overlay content signals may be transmitted to the video processor 28 over a variety of different transport protocols. If the overlay content happens to be a sub-window featuring full-motion video, bandwidth and storage requirements might become critical. In such cases it might be easier to transmit such data over MPEG-2 transport protocol, at a time closer to the actual insertion time.

The overlay content generator 28 may also be enabled to make a decision as to when and where the overlay content will be inserted. This gives the overlay content generator 28 the flexibility to overlay the main video signal at anytime without having to wait and depend on the tags in the main video program. Alternatively, flags can be provided in the overlay content signal header to override any of the tags in the main video program. This ability may be advantageous for emergency alert applications where overlay signals, consisting of text messages, are to have priority over all video programs. In this case the overlay content signal header could provide the information, such as insertion time, position, size, etc. Other parameters can be modified for each overlay content, such as opacity.

Those skilled in the art will appreciate that other effects can also be given to the overlayed content in accordance with the present invention.

Figure 4:
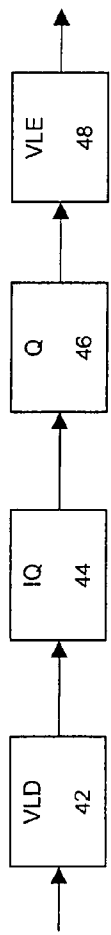
FIG. 4 shows a block diagram of a prior art open-loop transrater.

A simple prior art video transrater 40 that is compatible with compression standards such as MPEG-1, MPEG-2 or H.264 is shown in FIG. 4. The variable length decoder (VLD) module 42 receives a series of variable length codewords and reconstructs the quantized transform coefficients which these codewords represent. The inverse quantizer (IQ) module 44 performs an inverse quantization step in order to restore the proper scale and range to each transform coefficient. The quantizer (Q) module 46 rescales the transform coefficients once again, but this time the amount of quantization is controlled in order to maintain the desired output data rate. Finally, the variable length encoder (VLE) module 48 further compresses the quantized transform coefficients by representing them as a series of variable-length codewords.

The transrater 40 of FIG. 4 has two notable shortcomings. First, it cannot be used to assist with the insertion or overlay process, and second, the accuracy of the recompressed video signal begins to diverge due to the predictive coding components of the compression process. That is, as inaccuracies are introduced by the quantizer module 46, the resulting artifacts can become magnified when information derived from the resulting quantized coefficients is used to predict new information in a subsequent frame. Both of these shortcomings of the transrater 40 are addressed by the modified prior art transrating system 50 shown in FIG. 5.

Figure 5:
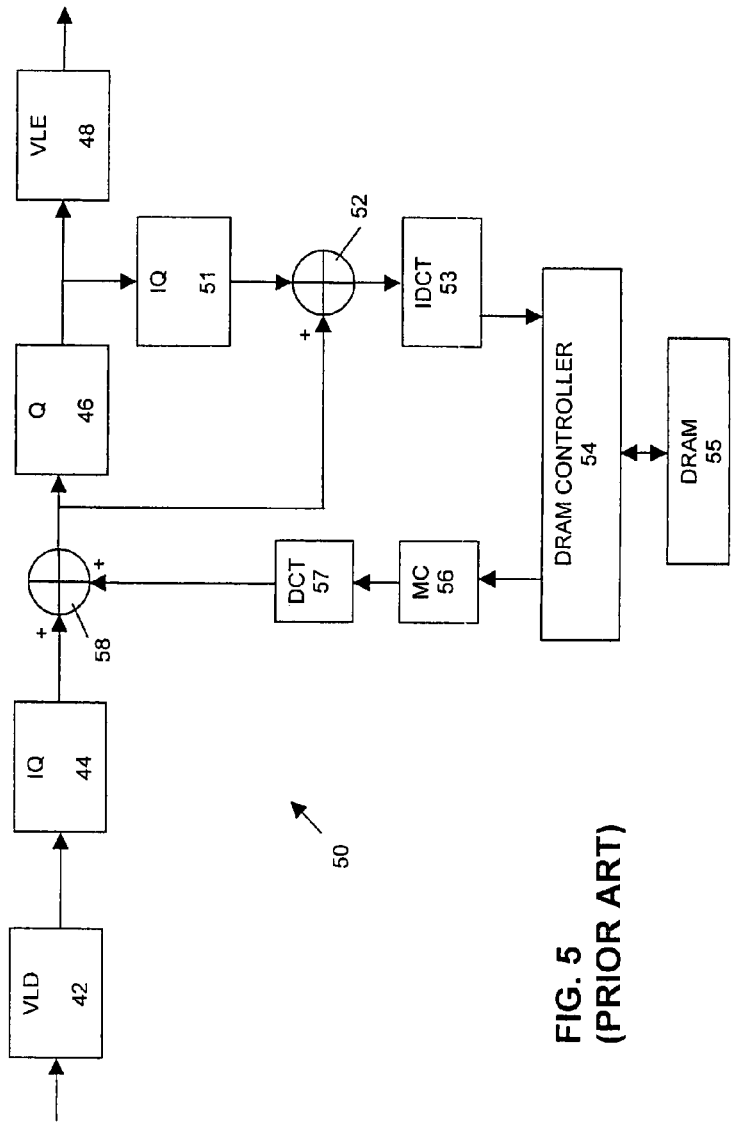
FIG. 5 shows a block diagram of a prior art closed-loop transrater with error control

In the prior art transrating system 50 shown in FIG. 5, the VLD module 42, the IQ module 44, the Q module 46, and the VLE module 48 function as discussed above in connection with FIG. 4. However, in the system 50 shown in FIG. 5, the quantization errors introduced by the transrating process (in particular by the quantization module 46) are provided at the output of adder 52 as a result of subtracting the transform coefficients obtained from IQ module 51 from the transform coefficients obtained from adder 58. Blocks of transform coefficients from adder 52 are then converted back to the pixel domain by inverse discrete cosine transform (IDCT) module 53 and the resulting pixel errors are then stored in DRAM 55, which is controller by DRAM controller 54. Pixel errors are retrieved by the motion compensator (MC) module 56 when needed for the prediction of other pixels in nearby image frames and are again converted to the coefficient domain by a discrete cosine transform (DCT) module 57. This result is added to the stream of incoming transform coefficients at adder 58, which prevents the accumulation of the requantization artifacts.

The prior art transrating system shown in FIG. 5 is representative of many predictive, transform based coders such as MPEG-1, MPEG-2, and H.264. Other compression systems may conform to the same structure, but may include additional steps, or alternative versions of the same modules. For example, the DCT is an example of a wider class of frequency-domain transforms, but any such transforms could be used in place of the DCT without altering the scope of the present invention.

The disadvantages of the motion compensated transrating system shown in FIG. 5 are the increased complexity and cost of the additional hardware, and the compression inefficiencies resulting from the introduction of error compensation data at the output of the motion compensated tracking loop. Complexity is also introduced since DCTs, IDCTs, and motion compensators are generally implemented by processing all coefficients or pixels of every block. In contrast, it is only necessary to process the non-zero coefficients, and scan order conversions may be ignored, when implementing the open-loop transrater in FIG. 4. This permits the use of narrower data buses and enables higher throughputs. However, it is possible to benefit from the drift correction advantage of this closed-loop transrater while minimizing the disadvantages if a hybrid solution is adopted in accordance with an example embodiment of the present invention as shown in the FIG. 6.

Figure 6:
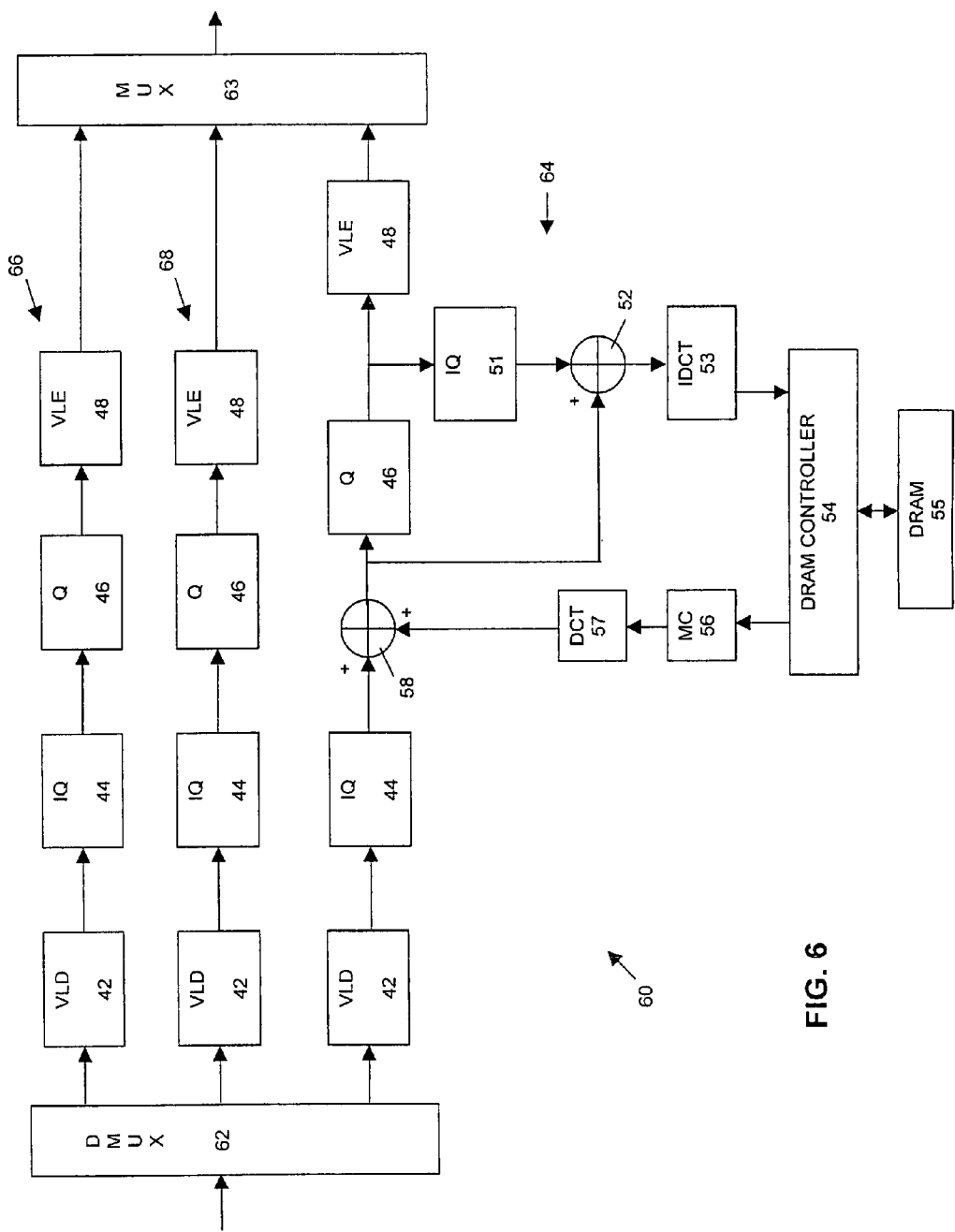
FIG. 6 shows a block diagram of an example embodiment of a hybrid transrating system in accordance with the present invention.

The particular example embodiment of the hybrid transrating system 60 of present invention shown in FIG. 6 includes one closed-loop subsystem 64 (e.g., the system 50 of FIG. 5) and two dedicated open-loop subsystems 66, 68 (e.g., each corresponding to the FIG. 4 transrater 40) and the operation of these subsystems is substantially as described above in connection with FIGS. 4 and 5. The subsystems can be operated concurrently by simultaneously providing a different video frame to each of the three subsystems. Note that the task of assigning frames and scheduling packets corresponding to a plurality of video signals is handled by the CPU 34 shown in FIG. 3, so a software adjustment is all that is needed. Packets arriving at the demultiplexer (DMUX) 62 in FIG. 6 would be routed to the appropriate subsystem (e.g., either subsystem 64, 66, or 68) according to routing information provided in the packet headers. The transrated packets can then be multiplexed together at multiplexer (MUX) 63.

The full cost and performance advantages of the hybrid transrating system 60 are only achieved by strategically assigning the video frames to the different transrating subsystems. With compression systems such as MPEG-2 and H.264, certain types of frames (i.e., an Intra-coded frame or I-frame and a Predictive coded frame or P-frame) are used to predict other frames while a third type of frame (i.e. a Bi-directionally predicted or B-frame) typically are not (although H.264 permits the use of B-frames as reference frames for prediction). The frame types also differ in the way that they are encoded. I-frames do not benefit from motion compensation and therefore are the least efficient to compress. However, for the same reason, these are the only types of frames that can be reconstructed by a decoder which is attempting to synchronize with a new stream. This initial synchronization is necessary when tuning to a new stream or when recovering from errors induced by noise in the transmission channel. For this reason, an encoder usually selects the I-frame encoding method at intervals sufficient for decoder initialization or resynchronization.

P-frames benefit from motion compensation using motion predictors referenced to preceding frames. Both I- and P-frames can serve as reference frames when motion compensation is used for the prediction of other frames. As a result, any error that is introduced into an I- or P-frame could become magnified each time the affected region of the reference frame is accessed. The closed-loop transrating process of subsystem 64 prevents this accumulation of errors, and for this reason it is advantageous to select the closed loop transrating subsystem 64 for transrating of both I- and P-frames.

Typically, B-frames are used most frequently since they benefit from multiple motion compensated predictors referenced to I- or P-frames, either in the forward or backward directions. Since these frames typically are not used to predict other pictures, drift correction becomes less important and the reduced compression efficiency due to correction could even out-weigh any advantage resulting from the reduced drift within a single image. Therefore, it is advantageous to route the B frames through one of the open loop transrating subsystems 66 or 68. Note that in the case of H.264, it makes more sense to identify the pictures which are not used as reference frames for other pictures, and to assign only these pictures to the open loop transrating subsystems 66 or 68.

Many encoders are configured to use the B-frame encoding method for 2 out of every 3 frames or pictures and this is the reason for matching 2 dedicated open-loop transraters 66 and 68 with a single closed-loop transrater 64 in the example embodiment of FIG. 6. However, open-loop and closed-loop subsystems could be provided in any combination. Note that B-frames are easily forwarded to the closed loop transrater 64 in cases where the open-loop systems 66 and 68 become oversubscribed. Similarly, it is possible to forward I- or P-frames to one of the open-loop transraters 66 or 68 if the closed-loop transrater 64 becomes oversubscribed, however, the benefits of drift compensation will not be realized during such periods.

Figure 7:
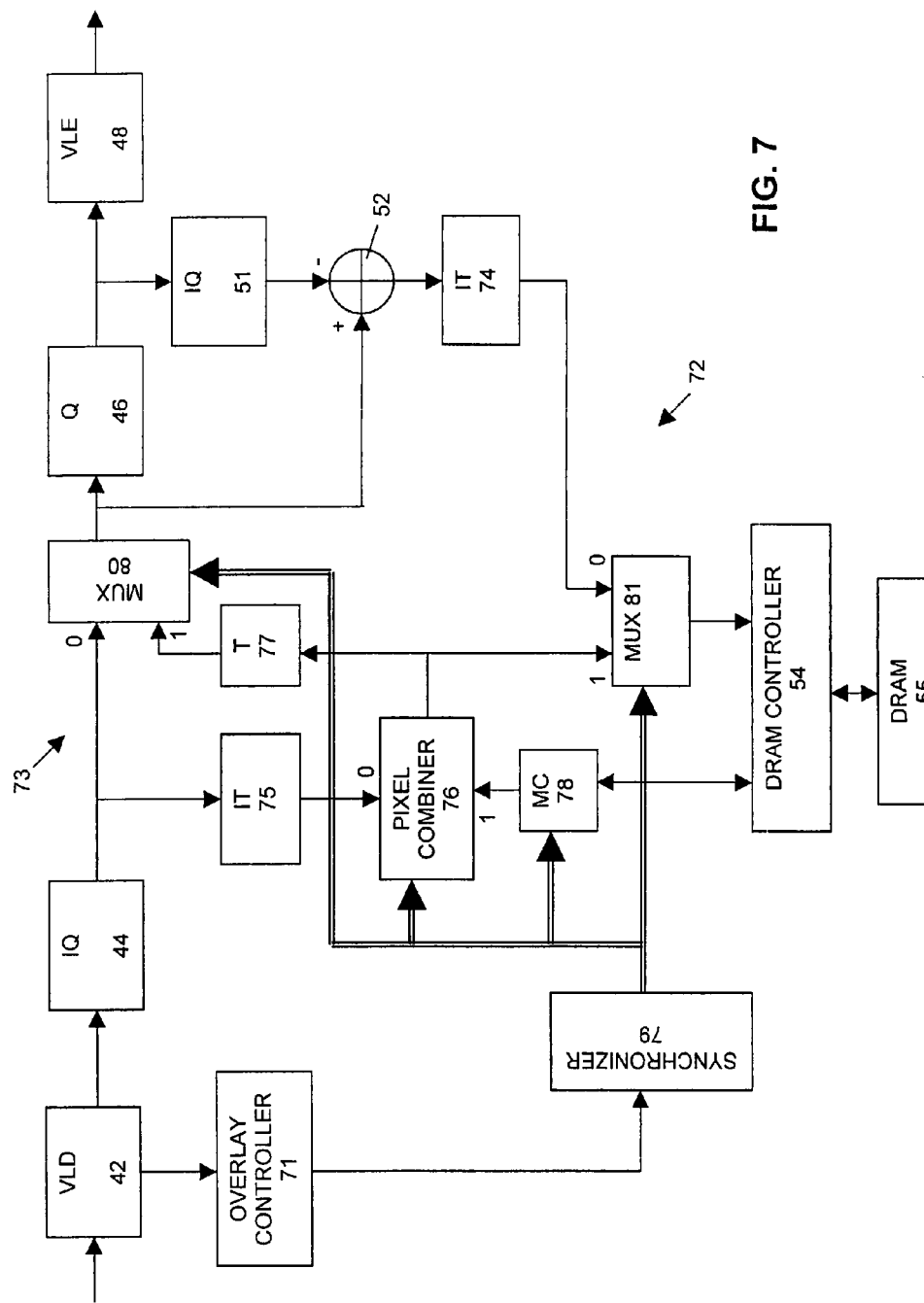
FIG. 7 shows a block diagram of a further example embodiment of a hybrid transrating system in accordance with the present invention.

The prior art closed-loop transrating system 50 in FIG. 5, and the example embodiment of the hybrid transrating system 60 in FIG. 6, can both be adjusted to support insertions and overlays. FIG. 7 shows an example embodiment of a transrating system 70 which supports insertions and overlays in accordance with the present invention.

In the example embodiment of the present invention shown in FIG. 7, an overlay content signal containing overlay content is received (e.g., from overlay generator 26 of FIG. 2) and decoded at VLD module 42. In addition, a compressed video signal is received from a video source (e.g., video sources 21, 22, 24, or 25 of FIG. 2) and decoded at VLD module 42. An insertion window portion of the decoded video signal is identified at overlay controller 71. The overlay content signal and the insertion window portion of the decoded video signal are processed by the transrating system 70 to produce a modified insertion window portion of the video signal. The video signal and the modified insertion window portion are then processed by the transrating system 70 to produce a modified video signal.

The data rate of the video signal may be modified during the overlay content insertion process. A closed-loop transrating path 72 for may be provided for modifying a data rate of the video signal. In addition, an open-loop transrating path 73 may also be provided for modifying the data rate of the video signal (e.g., the open-loop transrating path 73 may be provided by setting MUX 80 to select only input 0 from IQ module 44). The closed-loop transrating path 72 may be selected for modifying the data rate of the insertion window portion of the video signal.

Pixel quantization error control may be provided in the closed loop transrating path 72. The pixel quantization error control may comprise obtaining errors from the quantization of transform coefficients of incoming pixels of the video signal in the form of error transform coefficients. For example, the quantization errors introduced by the transrating process (in particular by the quantization module 46) are provided at the output of adder 52 as a result of subtracting the transform coefficients obtained from IQ module 51 from the transform coefficients obtained from MUX 80. Blocks of transform coefficients from adder 52 are then converted back to the pixel domain by inverse transform (IT) module 74. These pixel errors may be stored in DRAM 55 and then retrieved during modification of the data rate of associated pixels. The pixel errors in DRAM 55 may be added at pixel combiner 76 to the incoming pixels obtained from the inverse transformation process at IT module 75 to obtain corrected pixels in order to prevent accumulation of requantization artifacts during the quantization of transform coefficients corresponding to the incoming pixels at Q module 46. A transformation process may be performed on the corrected pixels at Transformation (T) module 77 to provide error corrected transform coefficients for the quantization at Q module 46.

It should be appreciated that the transformation process performed at T module 77 may be a discrete cosine transformation process (DCT) or any other transformation process that may be used with newer codecs, such as H.264. Similarly, the inverse transformation process performed at IT modules 74 and 75 may be an inverse discrete cosine transformation process (IDCT) or any other transformation process that may be used with newer codecs, such as H.264.

The closed-loop transrating path may be selected for modifying the data rate of I-frames and P-frames of the video signal. The open-loop transrating path may be selected for modifying the data rate of B-frames of the video signal.

The closed-loop transrating path 72 and the open loop transrating path 73 may be operable simultaneously, for example when processing frames of multiple video signals. For example, the closed-loop transrating path 72 may be selected for modifying the data rate of I-frames and P-frames of one video signal and the open-loop transrating path 73 may be selected for modifying the data rate of B-frames of a different video signal. In some instances, both of the open-loop transrating path 73 and the closed loop transrating path 72 may be available for processing I-frames and P-frames of the video signals in the event that the closed-loop transrating path 73 becomes oversubscribed and there is available processing bandwidth for I- and P-frames in the open-loop transrating path 72. Similarly, both of the open-loop transrating path 73 and the closed loop transrating path 72 may be available for processing B-frames of the video signals in the event that the open-loop transrating path 72 becomes oversubscribed and there is available processing bandwidth for B-frames in the closed-loop transrating path 73. One or more additional open-loop transrating path may be provided for modifying the data rate of the video signals, as discussed below in connection with FIG. 12. The two open-loop transrating paths 121 and 122 and the closed-loop transrating path 72 may be operable simultaneously. Those skilled in the art will appreciate that additional open- or closed-loop transrating paths may be provided, as desired, for increasing the throughput of the system.

Note however that the system 70 of FIG. 7 is a transrating system which is capable of overlay processing. While in overlay processing mode, it is not possible to perform drift-compensated closed-loop transrating. However, it is still possible to perform open-loop transrating at the same time that the overlay processing is taking place.

The open-loop transrating path 73 may comprise; variable length decoding of the video signal at VLD module 42 to provide quantized transform coefficients; performing an inverse quantization operation on the transform coefficients at IQ module 44 to scale the transform coefficients; performing a quantization operation on the scaled transform coefficients at Q module 46 to re-scale the transform coefficients to achieve a desired data rate; and variable length encoding of the re-scaled transform coefficients at VLE module 48 to provide a video signal at the desired data rate.

In another example embodiment of the present invention, at least one of an obscured processing mode and an insert processing mode may be provided for carrying out the processing steps. The obscured processing mode may be operable for processing an obscured region of the video signal in which motion vectors of a current pixel block of the video signal reference a portion of the insertion window. The insert processing mode may be operable for the processing of the overlay content signal and the insertion window portion of the video signal to produce the modified insertion window portion. The overlay controller 71 may identify which processing mode is to be used by the system 70, as discussed in detail below in connection with FIG. 8.

In addition, a normal processing mode may be provided for processing the video signal when the video signal does not contain an insertion widow. The normal processing mode may comprise: variable length decoding of the video signal to provide quantized transform coefficients at VLD module 42; performing an inverse quantization operation on the transform coefficients at IQ module 44 to scale the transform coefficients; performing an inverse transformation process on the scaled transform coefficients at IT module 75 to convert the scaled transform coefficients into pixel values; summing the pixel values at pixel combiner 76 with motion-compensated pixel errors retrieved from DRAM 55 to provide error-compensated pixel values; performing a transformation process on the error-compensated pixel values at T module 77 to produce error-compensated transform coefficients; performing a quantization operation on the error-compensated transform coefficients at Q module 46 to re-scale the transform coefficients to achieve a desired data rate; and variable length encoding of the re-scaled transform coefficients at VLE module 48 to provide a video signal at the desired data rate.

The motion compensated pixel errors are obtained by obtaining errors from the quantization operation at Q module 46 in the form of pixel errors and storing the pixel errors in DRAM 55 (as discussed above). The pixel errors are retrieved from DRAM 55 when performing a motion compensation operation on associated pixels. The associated pixels and the pixel errors may then be processed at MC module 78 to provide the motion compensated pixel errors. The summing of the pixel values from IT module 57 with the motion compensated pixel errors at pixel combiner 76 prior to the transformation process at T module 77 prevents accumulation of requantization artifacts during the quantization operation at Q module 46. The quantization operation may then be performed at Q module 46 on the error-compensated transform coefficients to re-scale the transform coefficients to achieve the desired data rate without accumulation of quantization artifacts.

A limited processing mode may be provided for carrying out at least one of the processing steps when the obscured processing mode, the insert processing mode, and/or the normal processing mode are not selected. The limited processing mode may comprise: variable length decoding of the video signal at VLD module 42 to provide quantized transform coefficients; performing an inverse quantization operation on the transform coefficients at IQ module 44 to scale the transform coefficients; performing a quantization operation on the scaled transform coefficients at Q module 46 to re-scale the transform coefficients to achieve a desired data rate; variable length encoding of the re-scaled transform coefficients at VLE module 48 to provide a video signal at the desired data rate; performing an inverse transformation process at IT module 75 on the scaled transform coefficients to convert the scaled transform coefficients into pixel values; adding the pixel values at pixel combiner 76 to motion compensated pixels retrieved from pixel memory (DRAM 55) to obtain decoded pixel values; and storing the decoded pixel values in DRAM 55.

The obscured processing mode may comprise: variable length decoding of the obscured region of the video signal at VLD module 42 to provide quantized transform coefficients; performing an inverse quantization operation on the transform coefficients at IQ module 44 to scale the transform coefficients; performing an inverse transformation process on the scaled transform coefficients at IT module 75 to convert the scaled transform coefficients into pixel values; adding the pixel values at pixel combiner 76 to motion compensated pixels retrieved from pixel memory (DRAM 55) to obtain decoded pixel values; storing the decoded pixel values in DRAM 55; and processing the decoded pixel values to modify the current pixel block such that the current pixel block does not require reference to any portion of the insertion window of the video signal for decoding.

The processing of the decoded pixel values may comprise: performing a transformation process on the decoded pixel values at T module 77 to reproduce the scaled transform coefficients; performing a quantization operation on the scaled transform coefficients at Q module 46 to re-scale the transform coefficients to achieve a desired data rate; and variable length encoding of the re-scaled transform coefficients at VLE module 48 to provide an intra coded pixel block in place of the current pixel block at the desired data rate.

In a further example embodiment, the processing of the stored decoded pixel values may comprise: performing a motion compensation operation on the stored decoded pixel values at MC module 78 to reconstruct the obscured region of the video signal; performing a transformation process on the motion compensated pixel values at T module 77 to reproduce the scaled transform coefficients; performing a quantization operation on the scaled transform coefficients at Q module 46 to re-scale the transform coefficients to achieve a desired data rate; and variable length encoding of the re-scaled transform coefficients at VLE module 48 using new motion vectors obtained from the motion compensation operation performed at MC module 78 to provide a modified pixel block in the video signal in place of the current pixel block at the desired data rate.

The processing of the overlay content signal and the insertion window portion of the decoded video signal to produce the modified insertion window portion of the video signal may occur with the transrater 70 set to the insert processing mode. The insert processing mode may comprise: variable length decoding of the insertion window portion of the video signal at VLD module 42 to provide quantized transform coefficients; performing an inverse quantization operation on the transform coefficients at IQ module 44 to scale the transform coefficients; performing an inverse transformation process on the scaled transform coefficients at IT module 75 to convert the scaled transform coefficients into pixel values corresponding to the insertion window portion; adding the pixel values to motion compensated pixels retrieved from pixel memory (DRAM 55) at pixel combiner 76 to obtain decoded pixel values; storing the decoded pixel values corresponding to the insertion window portion in DRAM 55; combining at pixel combiner 76 pre-stored pixel values corresponding to the overlay content with at least a portion of the stored decoded pixel values corresponding to the insertion window portion to provide modified decoded pixel values; performing a transformation process on the modified decoded pixel values at T module 77 to provide modified scaled transform coefficients; performing a quantization operation on the modified scaled transform coefficients at Q module 46 to re-scale the modified transform coefficients to achieve a desired data rate; and variable length encoding of the re-scaled modified transform coefficients at VLE module 48 to provide the modified video signal at the desired data rate.

The pre-stored pixel values in DRAM 55 corresponding to the overlay content may be obtained by: variable length decoding of the overlay content signal at VLD module 42 to provide quantized transform coefficients corresponding to the overlay content; performing an inverse quantization operation on the transform coefficients corresponding to the overlay content at IQ module 44 to scale the transform coefficients; performing an inverse transformation process on the scaled transform coefficients at IT module 75 to convert the scaled transform coefficients into pixel values corresponding to the overlay content; and storing the pixel values corresponding to the overlay content in DRAM 55 to obtain the pre-stored pixel values corresponding to the overlay content.

The overlay content may be inserted into the video signal in place of the insertion window portion of the video signal to produce the modified insertion window portion. In this case, the pixel combiner 76 would replace the decoded pixel values corresponding to the insertion window portion of the video signal with the absolute pixel values corresponding to the overlay content. Alternatively, the overlay content may be blended with the insertion window portion of the video signal to produce the modified insertion window portion. In this case, the pixel combiner 76 would blend the decoded pixel values corresponding to the insertion window portion of the video signal with the absolute pixel values corresponding to the overlay content, using, for example, alpha blending techniques.

Figure 9:
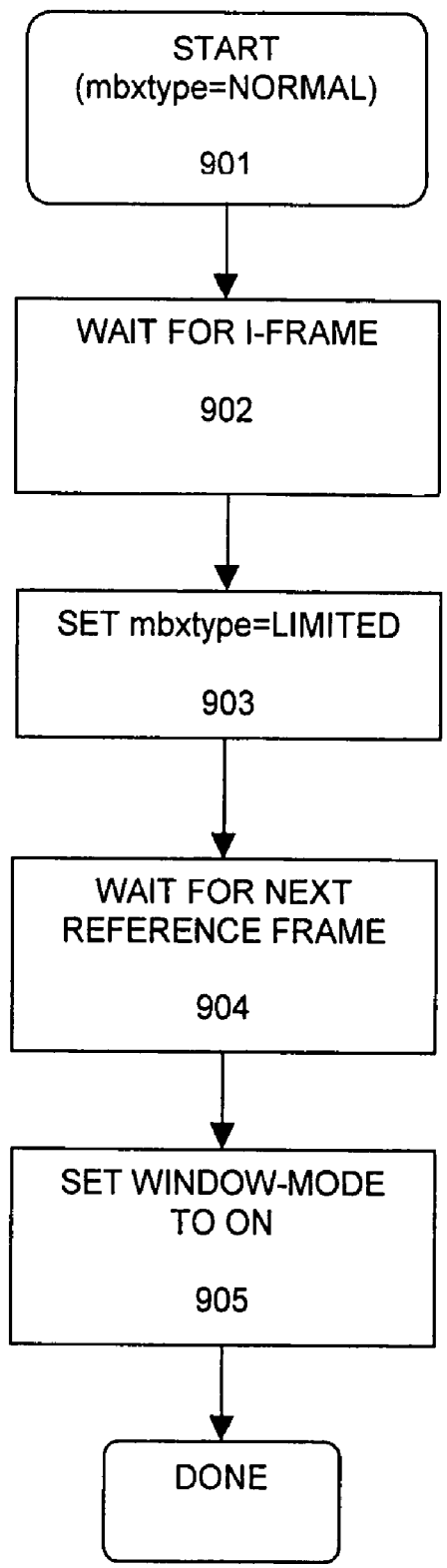
FIG. 9 shows a flowchart of a transition from a normal processing mode to a mode compatible with overlay processing in accordance with an example embodiment of the present invention.

A system operating in the normal processing mode (e.g., utilizing the closed-loop transrating path 72) must be transitioned into the limited processing mode (e.g., utilizing the open-loop transrating path 73) before overlays can be performed in the insert processing mode. An example embodiment for performing such a transition from the normal processing mode without introducing video artifacts is shown by the flowchart of FIG. 9. The first step in transitioning from the normal processing mode (at START, Step 901) to the insert processing mode may comprise waiting to receive an I-frame in the video signal (Step 902). An I-frame is required since the pixel errors that are currently stored in DRAM 55 must be replaced by fully decoded pixels. The I-frame serves as an access point for initiating the decoding process. Although it would be possible to insert overlay content into this I-frame, it would not be possible to insert overlay content into any non-reference frames (e.g., B-frames) which immediately follow the reference frame. Therefore, the insertion of overlay content is deferred until the next reference frame is encountered (Step 904). Meanwhile, the processing mode type (mbxtype) is set to the limited processing mode (Step 903) in order to decode and store the reference frames in DRAM 55 and to avoid accessing DRAM 55 while processing the non-reference frames which may follow. The transition is completed when the next reference frame is encountered at Step 904. At this time, a window-mode is switched from "off" to "on" enabling an insertion window in the video signal (Step 905). Completion of this transition enables the regular overlay process to begin and the processing mode can then be switched from the limited processing mode to the insert processing mode for processing a region of the video signal corresponding to the insertion window. The processing mode may be switched from the limited processing mode to the obscured processing mode when processing regions of the video signal external to the insertion window portion if motion vectors corresponding to the external regions reference the insertion window portion in a previously decoded frame.

Figure 10:
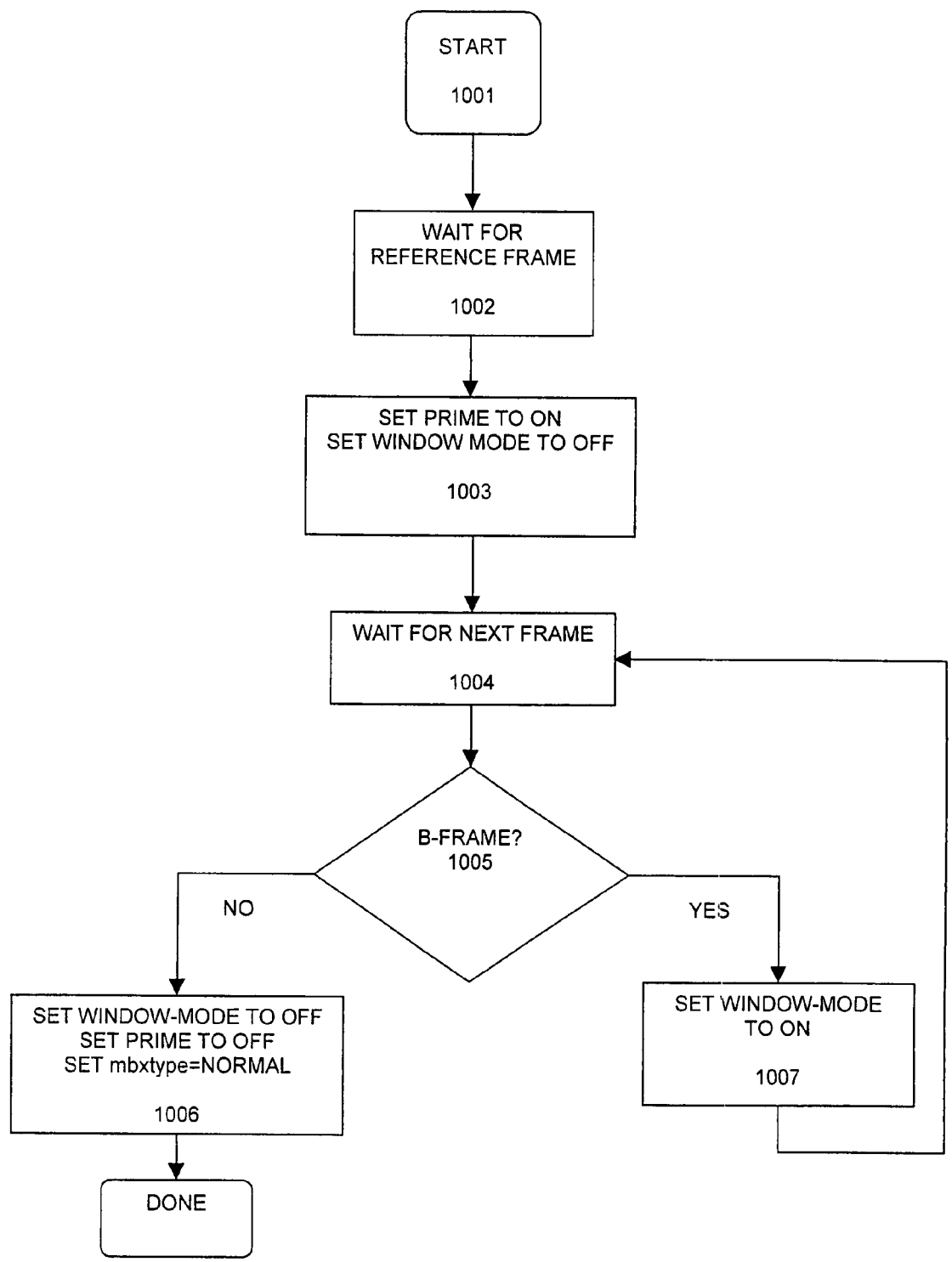
FIG. 10 shows a flowchart of a transition from a mode compatible with overlay processing mode to a normal processing mode in accordance with an example embodiment of the present invention.

The transition from an overlay processing mode back to normal transrating mode must also be sequenced in order to avoid introducing visible artifacts. An example embodiment of a properly sequenced transition to normal processing mode is shown by the flowchart in FIG. 10. At START (Step 1001) the transrater 70 is set to the insert processing mode. The first step in transitioning from the insert processing mode to the normal processing mode may comprise waiting to receive a reference frame (Step 1002). Once a reference frame is received, the prime-mode may be set to "on" initiating a resetting of a memory used to process the reference frame (e.g., DRAM 55) (Step 1003). For example, during this process, the data that would normally be written to DRAM 55 during the course of processing the reference frame will be dropped and replaced with zeroes instead. This initializes the DRAM 55 in the same way that an I-frame or other reference frame resets the requantization errors during closed loop operation of the transrater 70. At the same time (Step 1003), the window-mode is set to "off" to prevent creation of an insertion window in a current portion of the video signal (e.g., in the current frame). However, it should be noted that the overlay window cannot be suppressed in any frames, for example B-frames, which are received after the reference frame (but are to be displayed before the I or P frame or other reference frame), since the information needed to reconstruct the OBSCURED blocks is no longer available. Thus, once a next frame of the video signal is received (Step 1004), it can be determining if the next frame is a B-frame or other frame to be displayed before the reference frame received at step 1002. If the next frame is a B-frame, then the window-mode may be set to "on" enabling the insertion window in the video signal, thereby allowing the overlay window to remain visible while these out-of-order pictures are displayed. Otherwise, the window-mode may be set to "off," the prime mode may be set to "off," and the processing mode may be switched to the normal processing mode (Step 1006).

The transition procedures are easily adjusted to accommodate advanced codecs such as H.264 which can utilize more than two reference frames for motion compensation. To do so the transrater 70 simply needs to keep track of where overlay windows may be positioned in each reference frame. For example, if a motion vector references an overlay region, but if the overlay window was not active when the particular reference frame was processed, then the overlap can be ignored and no special processing is necessary. Similarly, if processing a region of an overlay window that has just been deactivated, then special processing is only necessary if referencing the corresponding overlay region of a reference frame, and if the overlay window was active at the time that the reference frame was processed.

The pixel combiner 76 may be provided along with a first multiplexer 80 and a second multiplexer 81, as shown in FIG. 7. The first multiplexer 80 may be provided for selecting at least one of the transform coefficients from the inverse quantization operation at IQ module 44 or a signal from the pixel combiner 76 (e.g., via T module 77). The second multiplexer 81 may be provided for selecting at least one of the pixel errors from the quantization operation (e.g., provided by IT module 74) or the signal from the pixel combiner 76. The signal from the pixel combiner 76 may comprise at least one of stored overlay content pixels or main video content pixels obtained from processing of the video signal.

An overlay controller 71 may be provided for controlling at least one of the first multiplexer 80, the second multiplexer 81, the pixel combiner 76, and the MC module 78. A synchronizing signal may be provided from synchroniser 79 for synchronizing the operation of the first multiplexer 80, the second multiplexer 81, the pixel combiner 76, and the MC module 78. The synchronizing signal may be generated by the synchronizer 79 in response to a signal from the overlay controller 71 identifying which processing mode is to be used (e.g., normal, limited, obscured, or insert). The synchronizer may also be used to synchronize the inverse quantization operation, the quantization operation, and the variable length encoding operation, although signal paths for the synchronizing signal are not shown in the Figures.

Different overlay content may be provided to the transrater 70 in one or more overlay content signals. A tag may be appended to at least one of: (a) the video signal; and (b) at least one of the one or more overlay content signals as discussed above in connection with FIGS. 2 and 3.

Figure 11:
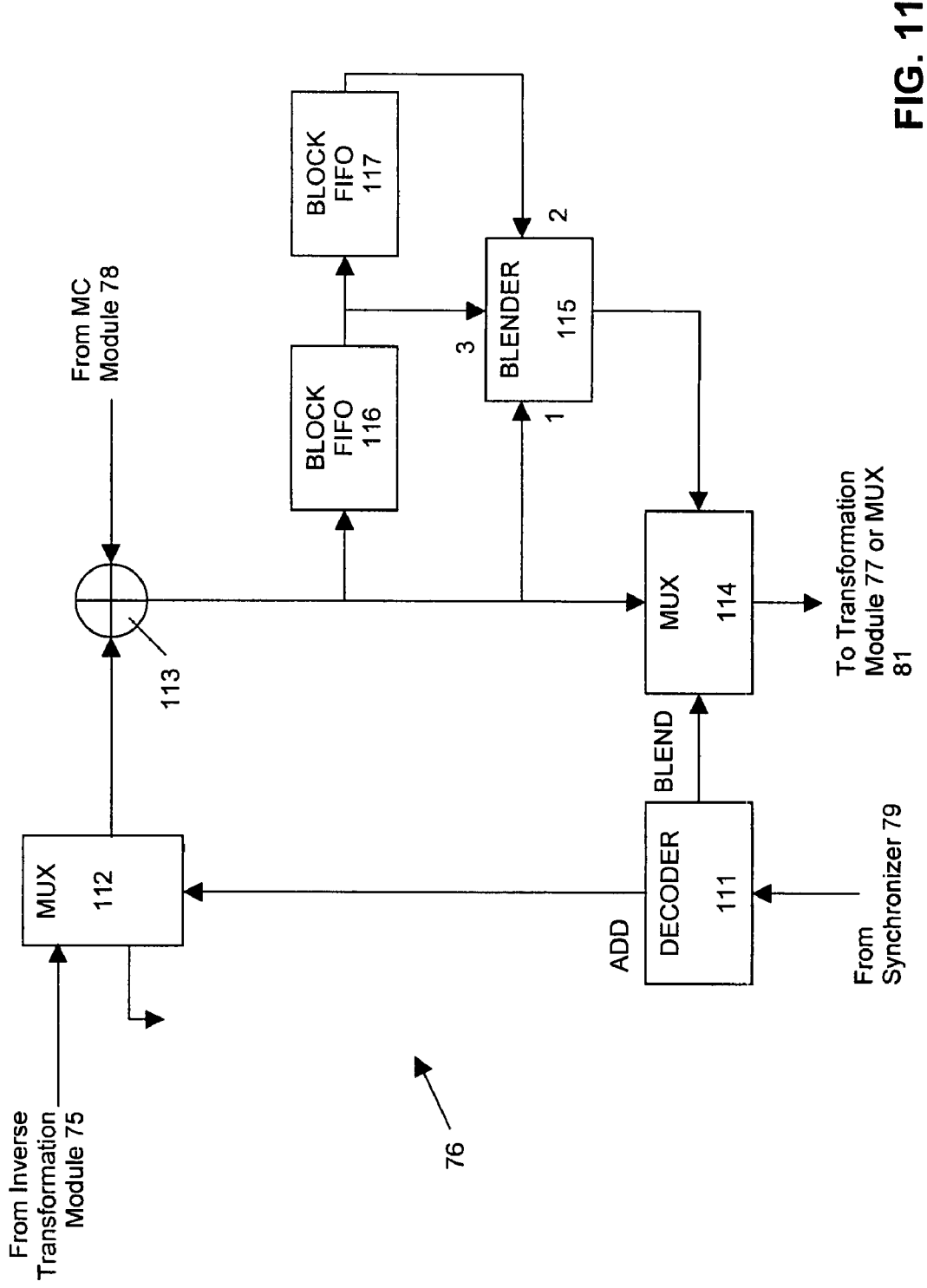
FIG. 11 shows a block diagram of an example embodiment of a pixel combiner in accordance with the present invention.

A block diagram of an example embodiment of a pixel combiner 76 in accordance with the present invention is provided in FIG. 11. The pixel combiner 76 may be configured by a signal from the synchronizer 79 to perform a simple insertion (e.g., add the overlay content into the video signal), or it may be configured to overlay the content on top of the existing frames of the video signal (e.g., blend the overlay content with a portion of the video signal). For Example, the synchronizer 79 may send a control signal which is received and decoded at decoder 111 of pixel combiner 76. In the event of a simple insertion, multiplexer 112 will select the input from the Inverse Transformation Module 75, and adder 113 will add this signal to the output from MC module 78 of FIG. 7. The resulting pixel values will be forwarded directly to transformation module 77 via multiplexer 114, thereby bypassing blender module 115.

In the event of a blending operation, multiplexer 114 will select the output of blender module 115 for forwarding to transformation module 77. Many blending effects are possible, and in this case, it is advantageous to utilize a portion of DRAM 55 to control the blending operation. For example, in addition to storing the luminance and chrominance information for each pixel that is to be inserted into the frame, it is useful to allocate additional bits to guide the blending process. These control bits could control the weighting of both the insertion pixel and the background pixel (alpha-blending), in addition to other special effects. Note that a second access to DRAM 55 is needed to retrieve the background pixels if blending is to be performed. When retrieving background pixels from DRAM, MUX module 112 is configured to select the input which is fixed at zero, thereby causing the signal from DRAM, received via MC module 78, to be forwarded directly to the output of adder 113.

The pixel combiner in FIG. 11 assumes that pixels are delivered from DRAM 55 (via MC module 78) by the DRAM controller 54 in a certain order. If blending is to be applied for a particular block, then the background pixels are first retrieved from the main picture, followed by the control bits which guide the blending process, and finally the pixels comprising the corresponding block of the insertion window. Simple fixed delay Block FIFO memories 116 and 117 are then used to provide the control data to input port 3 of the blender 115, the background data to input port 2 of the blender 115, and the insertion data at input port 1 of the blender 115.

Referring to the Example embodiment shown in FIG. 7, consider the case where MUX 80 is configured to select input 1, MUX 81 is configured to select input port 0, and the pixel combiner simply adds the input at port 1 from the MC module 78 and the input at port 0 from the IT module 75. The resulting system then becomes functionally equivalent to the closed-loop transrater of FIG. 5. Note that the first adder 58 in FIG. 5 has been replaced in the FIG. 7 example embodiment by the pixel combiner 76 and a second IT module 75 has been added to allow the pixel combiner 76 to operate on pixels instead of transform coefficients. This modification is advantageous when implementing the overlay process and combining pixels from two different images (i.e., images from the overlay content and the original signal).

Before implementing overlays or insertions, the overlay content should be received, processed and stored in DRAM 55. During an insertion, the overlay content must be stored in DRAM 55 as decoded pixels instead of the pixel errors that are used for error compensation. Essentially, during the insertion process the system must perform a decoding function instead of a transrating function. This result is achieved by configuring MUX 81 to select input 1 and configuring the pixel combiner 76 to add the input at port 1 from the MC module 78 and the input at port 0 from the IT module 75. Note that overlay content encoded as I-frames can be forwarded from input port 0 of the pixel combiner 76 directly to the output port of the pixel combiner 76.

One of the problems that may occur when processing a frame or other portion of the signal that includes an insertion window, is that the motion compensator MC 78 may need to access a region of a reference frame which coincides with the position of the insertion window. The problem is that the decoder has lost this reference frame information since this section of its memory has now been replaced with the content of the insertion window. Therefore the decoder is no longer synchronized with the original encoding process and the motion compensation process can lead to serious visible artifacts in cases such as this. One task of the example embodiment shown in FIG. 7 is to repair or prevent this damage to the integrity of the signal. However, this is only possible if the transrater 70 has access to the reference frame pixels that the decoder has lost. Unfortunately, the closed-loop transrater of FIG. 5 only maintains pixel errors in DRAM 55 and this information is not useful for preventing motion compensation errors. One solution is to replicate the DRAM 55 and associated input and output modules in order to maintain access to both the pixel errors needed for transrating and the absolute pixels needed to repair the motion compensation process. A second option is to switch from closed-loop transrating mode to open-loop transrating mode while the insertions are being performed. Considering the cost, complexity, and the slight but temporary reduction in image quality, this is the preferred solution and the one which will be described in further detail. However, the memory replication option is straightforward and should not require additional explanation to those skilled in the art.

The overlay controller 71 in FIG. 7 manages the combining of the insertion video (overlay content) with the main video signal. The overlay controller 71 may generate a MBXTYPE code which specifies which processing mode to be used by the system (e.g., normal, insert, limited, or obscured processing mode). The MBXTYPE code is forwarded from the overlay controller 71 to the synchronizer 79, where it is used to configure the settings of MUX 80, MUX 81, the pixel combiner 76, and the MC module 78. The settings corresponding to each MBXTYPE result are listed in Table 1 below. Note that two blocks are processed when MBXTYPE is set to INSERT, in order to deliver to the pixel combiner both the background pixels and the pixels to be inserted.

TABLE 1

| MBXTYPE | MUX 80 | MUX 81 | Pixel Combiner 76 |
| --- | --- | --- | --- |
| NORMAL | 1 | 0 | ADD |
| LIMITED | 0 | 1 | ADD |
| OBSCURED | 1 | 1 | ADD |
| INSERT | — | 1 | ADD |
|  | 1 | — | BLEND |

Figure 8:
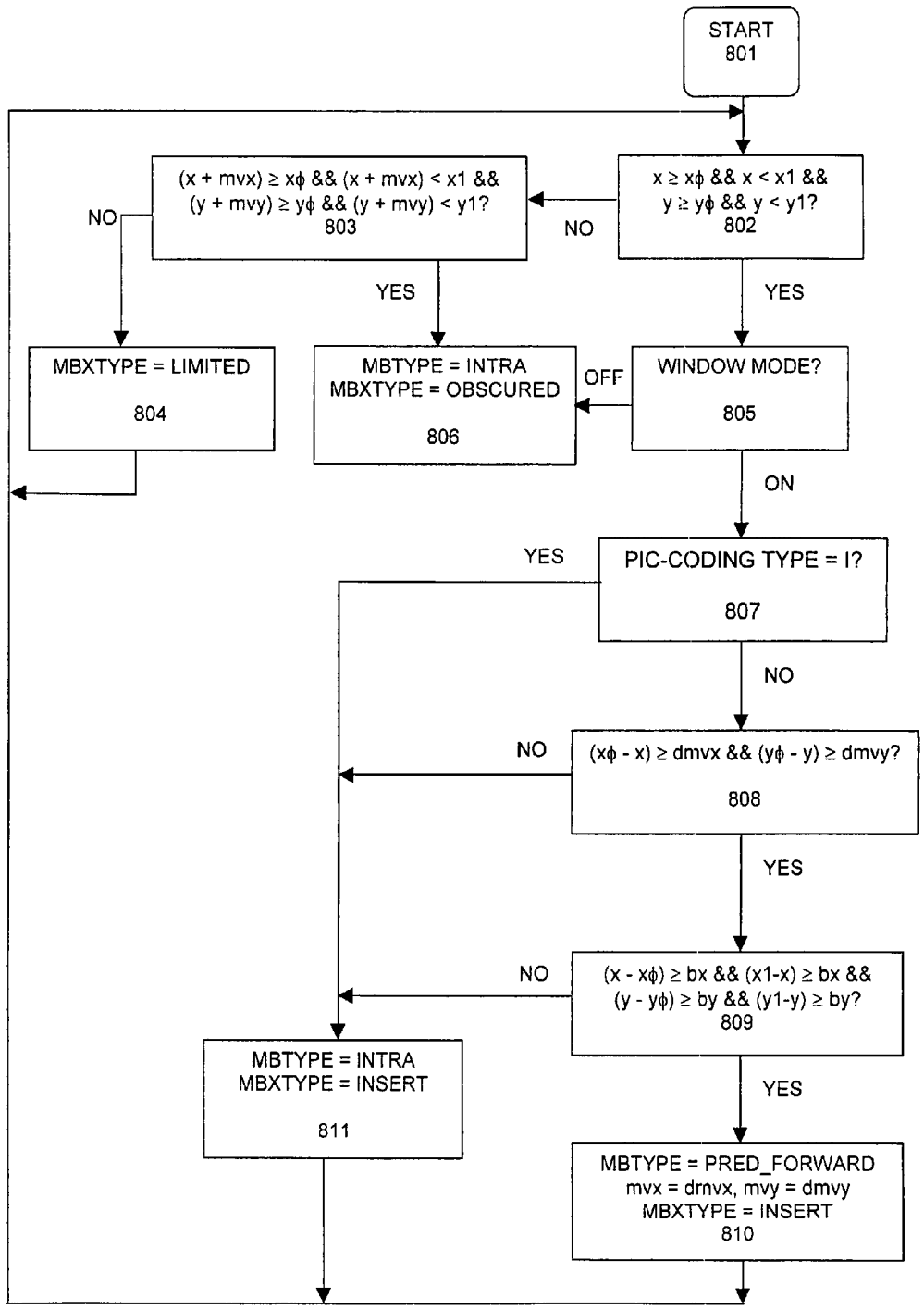
FIG. 8 shows a flowchart of the operation of an overlay controller in accordance with an example embodiment of the present invention.

MBXTYPE must be set to NORMAL when operating in the closed-loop transrating mode. However, this mode cannot be used when processing pictures which are to be modified by the insertion of overlay content. Instead, the system must be transitioned out of NORMAL mode as described previously with reference to FIG. 9. The flowchart in FIG. 8 depicts an example of the operation of the overlay controller 71 once the system has completed the transition from NORMAL processing mode Typically, the overlay controller 71 would set MBXTYPE to LIMITED when processing pictures which include one or more insertion windows. This causes the synchronizer 79 to configure MUX 80 to select input 0. At the same time, the pixel combiner 76 is configured to add the data received at port 1 from the MC module 78 and at port 0 from the IT module 75 and MUX 81 is configured to select input from port 1 (i.e., the signal from the pixel combiner 76) thereby forwarding the output from the pixel combiner 76 to DRAM 55 via the memory controller 54. In effect, the system 70 is decoding and storing the incoming frame at the same time that it is being transrated.

At step 802 of FIG. 8, the location of a macroblock is compared with the location of the insertion window. If the macroblock does not fall within the insertion window, then the overlay controller 71 may determine that the decoding of a particular block requires access to a portion of the reference frame which overlaps with the insertion window (Step 803 of FIG. 8). If the block uses motion compensation, then every applicable motion vector (with coordinates mvx, mvy) must be compared to the current position in order to detect a possible reference to the overlay region of a corresponding reference frame. Predictions are limited to one or two reference frames if using MPEG-1 or MPEG-2, but more advanced codecs such as H.264 may use more than two. If any of the motion vectors results in any sort of overlap with the overlay region of a reference frame, then MBXTYPE is set to OBSCURED (Step 806), and special processing is needed. From the flowchart in FIG. 8, notice that MBXTYPE may also be set to OBSCURED if processing the overlay region of the current frame and WINDOW-MODE is set to OFF (step 805). This is necessary to prevent: transient artifacts when overlay windows are switched on or off. This is described in detail above in connection with FIGS. 9 and 10.

When MBXTYPE is set to OBSCURED, the block is decoded and stored in the usual way. However, the block needs to be modified before it can be transrated and sent to the decoder. The preferred way to do this is to regenerate the block using intra coding instead of motion compensated predictive coding. This is accomplished by setting MUX 80 to select input 1. In this way, the decoded pixels that are provided at the output of the pixel combiner 76 are transformed by transformation module 77, then requantized by the quantizer module 46 and further compressed by the VLE module 48. The block is then decodable since no predictive coding is involved. Alternatively, the block could be recompressed by altering the motion vector(s) so that it no longer accesses a region overlapping with the insertion window. However, this would require another access to DRAM 55 and additional logic to derive a suitable alternative motion vector.

If it is determined at step 802 that a macroblock falls within the boundaries of the insertion window, and if WINDOW MODE is on (step 805), then the INSERT processing mode will be selected (step 810 or step 811). However additional logic is included in the flowchart of FIG. 8 in order to determine if the macroblock should be intra coded or coded using motion-compensated prediction. If it is determined that the picture is an I-frame at step 807, then intra mode is automatically selected (step 811).

The overlay controller 71 is able to accommodate time-varying insertions. This is controlled by the horizontal and vertical motion vectors codes, dmvx and dmvy respectively, which may be included in headers preceding the overlay content. This vector represents the displacement relative to the most recent frame of the overlay content that is to be displayed in the insertion window. For complex motion, dmvx and dmvy can be chosen to reference the location of an independent image in dram. In this case, the use of motion compensation will be prevented by comparison step 808 of the flow chart in FIG. 8, and the overlay content will be intra-coded instead. However, for simple displacements, such as the horizontal or vertical scrolling of a text message, dmvx and dmvy could specify the horizontal and vertical displacement relative to the most recently inserted image. Depending on the direction and amount of displacement, comparison step 808 will now permit the use of motion compensation in most regions of the insertion window.

The purpose of comparison step 809 is to allow parameters bx and by to signal the use of blending effects. In this case, bx specifies the width of the blended region at the left and right edges of the insertion window and by specifies the height of the blended region at the top and bottom edges of the insertion window. Bx and by should be set to at least the horizontal and vertical window dimensions of the insertion window, respectively, if blending is used throughout the entire region. If a block is to rendered without blending effects, then motion compensation is permitted (step 810). Similarly, if blending is not used at all, then bx and by should be set to 0. The overlay controller 71 will avoid the use of motion compensation and will use intra-coding instead in regions where special blending effects have been applied (step 811).

It should now be apparent that several efficiencies can be realized by implementing insertions and overlays with a design which supports video transrating. Blot only are the hardware and software requirements similar, but the variations in data rate resulting from the modification of the video content may emphasize the requirement for data rate control. It has been shown that the insertion process can be combined with a closed-loop video transrating design in accordance with example embodiments of the present invention. It has also been shown that the transrating process may be advantageously distributed over multiple closed-loop and open-loop processors (also referred to herein as "transrating paths" or "transraters") in accordance with example embodiments of the present invention.

Figure 12:
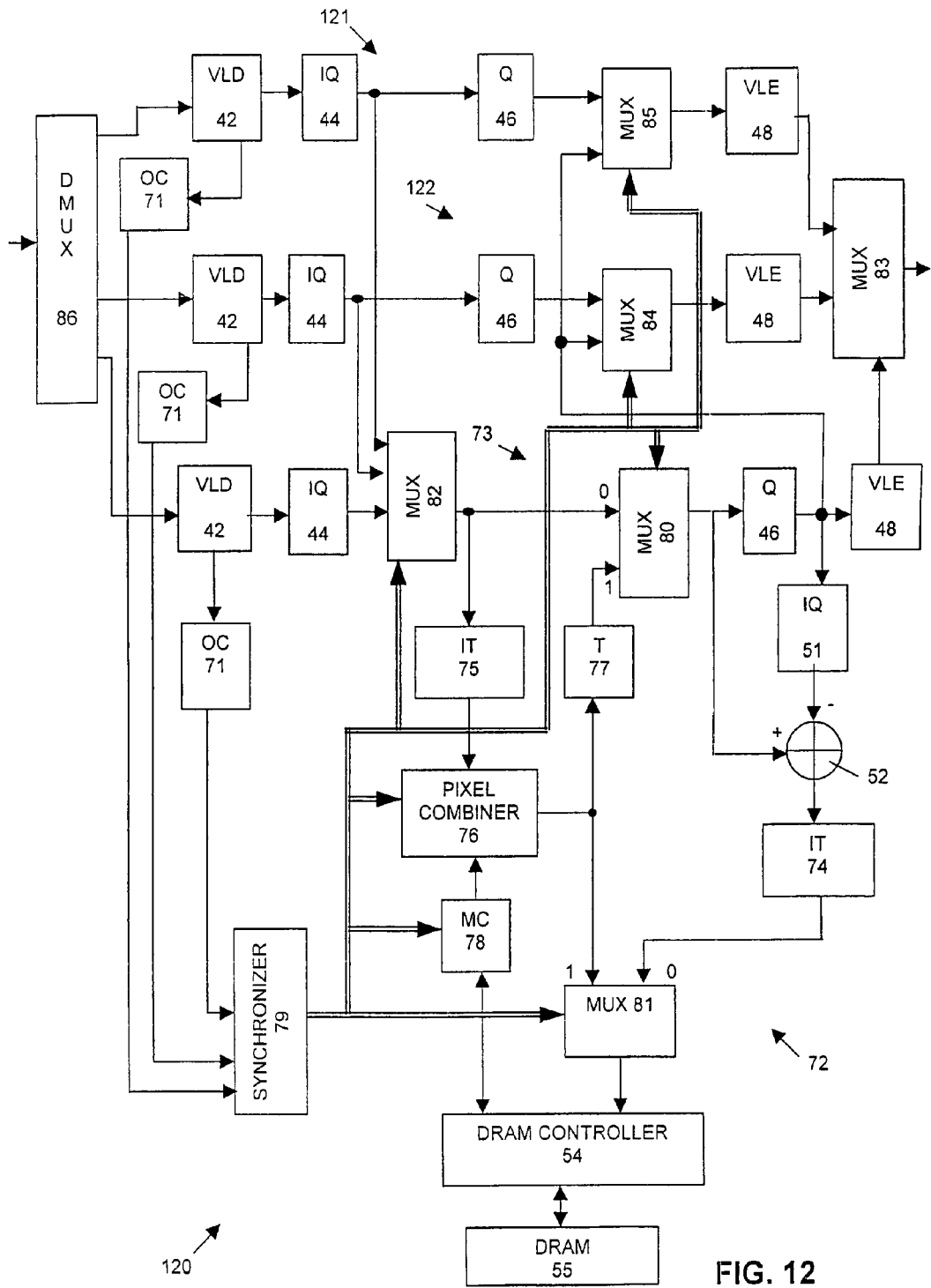
FIG. 12 shows a block diagram of an example embodiment of a multi-processor transrating system with insertion and overlay capabilities in accordance with the present invention.

The hybrid multi-processor transrater design (e.g., that of FIG. 6) can also be modified to support video insertions and overlays in accordance with example embodiments of the present invention. The system in FIG. 12 is an example embodiment of a multi-processor transrater 120 with insertion and overlay capabilities in accordance with the present invention. As before, it is advantageous to send I and P pictures (or other types of reference frames) to the closed-loop transrating path 72 while sending B pictures (or other types of non-reference frames) to either of the two dedicated open-loop transrating paths 121 and 122. As discussed above in connection with FIG. 7, an additional open-loop transrating path 73 may be provided by setting MUX 80 to accept only the input 0.

There are a few differences to note between this system 120 of FIG. 12 and the multi-processor design in FIG. 6 which does not support insertions. As with FIG. 7, the adder in FIG. 6 has been replaced by the pixel combiner module 76 and a second transformation module (T) 77 has been added to allow the pixel combiner 76 to operate on pixels instead of transform coefficients. Also note that both open-loop transrating paths 121 and 122 now have access to data retrieved from DRAM 55 via the MC 78, pixel combiner 76, T module 77, Q module 46, and MUX modules 80, 84, and 85. This path is utilized when the overlay controller 71 associated with one of the open-loop transrating paths 121, 122 determines that insertion data is needed (MBXTYPE=INSERT) or if motion prediction requires access to a portion of a reference frame which overlaps with the insertion window (MBXTYPE=OBSCURED). Also, to implement blending effects, MUX 82 has been added so that data from the dedicated open-loop transrating paths 121, and 122 may be forwarded to the pixel combiner 76 via the IT module 75.

It is worth noting that efficient implementations of VLD and VLE modules usually benefit by operating on only non-zero coefficients, while the transform modules, inverse transform modules, motion compensators, pixel combiners, and DRAM controllers are typically designed to receive and process every coefficient or pixel that exists. Although the example embodiment of FIG. 12 does not show the scan conversion modules needed to bridge the two sets of components together, these would optimally be placed at the output of MUX 82, and at the output of the Q module 46 in the closed loop circuit 72. Large buffers are also needed for efficient decoupling between the different processing rates of the two sets of components. Note that the operation of the IQ modules 44 and Q modules 46 of the open loop sub-systems 121 and 122, as well as the first IQ module 44 of the closed loop sub-system 72 would be limited to the non-zero coefficients.

The synchronizer module 79 has been modified to accept parameters from each of the VLD modules 42 and overlay controller modules 71. The output of the synchronizer 79 is also used to control new MUX modules 82, 84 and 85, in addition to the preexisting closed-loop modules MUX 80, MUX 81, and the pixel combiner 76. Each of the three processors submits an MBXTYPE parameter to the synchronizer 79 and waits for the synchronizer 79 to accept the request. For each block that is to be processed, the synchronizer 79 elects one of the three MBXTYPE parameters and configures certain modules as specified in Table 2 below. In most cases, there will be no contention for resources and the synchronizer 79 will be able to simultaneously accommodate requests from two or more processors. However, if the synchronizer 79 determines that more than one block requires access to shared resources such as DRAM 55 or the pixel combiner 76, then the requests will be sequenced and processed one at a time.

TABLE 2

| MBXTYPE | MUX 80 | MUX 81 | MUX 85 | MUX 84 | MUX 82 | Pixel Combiner |
|---|---|---|---|---|---|---|
| NORMAL_0 | — | — | 0 | — | — | — |
| LIMITED_0 | — | — | 0 | — | — | — |
| OBSCURED_0 | — | — | 1 | — | 0 | ADD |
| INSERT_0 | — | — | — | — | 0 | ADD |
|  | — | — | 1 | — | — | BLEND |
| NORMAL_1 | — | — | — | 0 | — | — |
| LIMITED_1 | — | — | — | 0 | — | — |
| OBSCURED_1 | — | — | — | 1 | 1 | ADD |
| INSERT_1 | — | — | — | — | 1 | ADD |
|  | — | — | — | 1 | — | BLEND |
| NORMAL_2 | 1 | 0 | — | — | 2 | ADD |
| LIMITED_2 | 0 | 1 | — | — | 2 | ADD |
| OBSCURED_2 | 1 | 1 | — | — | 2 | ADD |
| INSERT_2 | — | 1 | — | — | 2 | ADD |
|  | 1 | — | — | — | — | BLEND |

It should now be appreciated that the present invention provides advantageous methods, apparatus, and systems for inserting overlay content into a video signal. In addition, the present invention provides advantageous methods, apparatus, and systems for inserting overlay content into a video signal during transrating of the video signal.

Although the invention has been described in connection with various illustrated embodiments, numerous modifications and adaptations may be made thereto without departing from the spirit and scope of the invention as set forth in the claims.

What is claimed is:

1. A method for inserting overlay content into a video signal, comprising:
   receiving an overlay content signal containing overlay content;
   receiving a compressed video signal;
   decoding said compressed video signal;
   identifying an insertion window portion of said decoded video signal;
   processing said overlay content signal and said insertion window portion of said decoded video signal to produce a modified insertion window portion of said video signal; and
   processing said video signal and said modified insertion window portion to produce a compressed modified video signal;
   wherein:
      an insert processing mode is provided for said processing of said overlay content signal and said insertion window portion of said video signal to produce said modified insertion window portion;
      an obscured processing mode is provided for processing an obscured region of said video signal in which motion vectors of a current pixel block of the video signal reference a portion of said insertion window; and
      a limited processing mode is provided for said processing when said obscured processing mode and said insert processing mode are not selected.

2. A method in accordance with claim 1, further comprising:
   providing a closed-loop transrating path for modifying a data rate of the video signal;
   providing an open-loop transrating path for modifying the data rate of the video signal; and
   selecting said closed-loop transrating path for modifying the data rate of said insertion window portion of said video signal.

3. A method in accordance with claim 2, further comprising:
   providing pixel quantization error control in said closed loop transrating path.

4. A method in accordance with claim 3, wherein said pixel quantization error control comprises:
   obtaining errors from the quantization of transformation coefficients of incoming pixels of the video signal in the form of error transform coefficients;
   performing an inverse transformation process on said error transform coefficients to provide pixel errors in the pixel domain;
   storing said pixel errors;
   retrieving said stored pixel errors during modification of said data rate of associated pixels;
   adding said pixel errors to said incoming pixels obtained from an inverse transformation process to obtain corrected pixels in order to prevent accumulation of requantization artifacts during said quantization of transform coefficients corresponding to said incoming pixels; and performing a transformation process on said corrected pixels to provide error corrected transform coefficients for said quantization.

5. A method in accordance with claim 2, wherein said closed-loop transrating path is selected for modifying the data rate of I-frames and P-frames of said video signal.

6. A method in accordance with claim 2, wherein said open-loop transrating path is selected for modifying the data rate of B-frames of said video signal.

7. A method in accordance with claim 2, wherein said closed-loop transrating path and said open loop transrating path are operable simultaneously for processing frames of multiple video signals.

8. A method in accordance with claim 7, wherein:
said closed-loop transrating path is selected for modifying the data rate of I-frames and P-frames of said video signals; and
said open-loop transrating path is selected for modifying the data rate of B-frames of said video signals.

9. A method in accordance with claim 7, wherein:
both of said open-loop transrating path and said closed loop transrating path are available for processing I-frames and P-frames of said video signals.

10. A method in accordance with claim 7, wherein:
both of said open-loop transrating path and said closed loop transrating path are available for processing B-frames of said video signals.

11. A method in accordance with claim 2, further comprising:
an additional open-loop transrating path for modifying the data rate of the video signal.

12. A method in accordance with claim 11, wherein said two open-loop transrating paths and said closed-loop transrating path are operable simultaneously.

13. A method in accordance with claim 2, wherein said open-loop transrating path comprises:
variable length decoding of said video signal to provide quantized transform coefficients;
performing an inverse quantization operation on said transform coefficients to scale said transform coefficients;
performing a quantization operation on said scaled transform coefficients to re-scale said transform coefficients to achieve a desired data rate; and
variable length encoding of said re-scaled transform coefficients to provide a video signal at said desired data rate.

14. A method for inserting overlay content into a video signal, comprising:
receiving an overlay content signal containing overlay content;
receiving a compressed video signal;
decoding said compressed video signal;
identifying an insertion window portion of said decoded video signal;
processing said overlay content signal and said insertion window portion of said decoded video signal to produce a modified insertion window portion of said video signal;
processing said video signal and said modified insertion window portion to produce a modified video signal;
providing at least one of an obscured processing mode and an insert processing mode for carrying out said processing steps;
said obscured processing mode is operable for processing an obscured region of said video signal in which motion vectors of a current pixel block of the video signal reference a portion of said insertion window;
said insert processing mode is operable for said processing of said overlay content signal and said insertion window portion of said video signal to produce said modified insertion window portion;
providing a normal processing mode for processing said video signal when the video signal does not contain an insertion window; and
in said obscured processing mode, said current pixel block is modified such that said current pixel block does not require reference to said portion of said insertion window of the video signal for decoding providing a limited processing mode for carrying out at least one of said processing steps when said normal processing mode, said obscured processing mode, and said insert processing mode are not selected.

15. A method in accordance with claim 1, further comprising:
providing a normal processing mode for processing said video signal when said video signal does not contain an insertion window.

16. A method in accordance with claim 15, wherein said normal processing mode comprises:
variable length decoding of said video signal to provide quantized transform coefficients;
performing an inverse quantization operation on said transform coefficients to scale said transform coefficients;
performing an inverse transformation process on said scaled transform coefficients to convert said scaled transform coefficients into pixel values;
summing the pixel values with motion-compensated pixel errors to provide error-compensated pixel values;
performing a transformation process on said error-compensated pixel values to produce error compensated transform coefficients;
performing a quantization operation on said error-compensated transform coefficients to re-scale said transform coefficients to achieve a desired data rate;
variable length encoding of said re-scaled transform coefficients to provide a video signal at said desired data rate.

17. A method in accordance with claim 16 wherein said motion-compensated pixel errors are obtained by:
obtaining errors from the quantization operation in the form of pixel errors;
storing said pixel errors;
retrieving said stored pixel errors when performing a motion compensation operation on associated pixels;
processing said pixel errors and said associated pixels to provide said motion-compensated pixel errors;
wherein said summing of said pixel values with said motion-compensated pixel errors prior to said transformation process prevents accumulation of requantization artifacts during said quantization operation.

18. A method in accordance with claim 1, wherein:
said limited processing mode comprises:
variable length decoding of said video signal to provide quantized transform coefficients;
performing an inverse quantization operation on said transform coefficients to scale said transform coefficients;
performing a quantization operation on said scaled transform coefficients to re-scale said transform coefficients to achieve a desired data rate;
variable length encoding of said re-scaled transform coefficients to provide a video signal at said desired data rate;

performing an inverse transformation process on said scaled transform coefficients to convert said scaled transform coefficients into pixel values;

adding said pixel values to motion compensated pixels retrieved from pixel memory to obtain decoded pixel values; and storing said decoded pixel values.

19. A method in accordance with claim 1, wherein said obscured processing mode comprises:

variable length decoding of said obscured region of said video signal to provide quantized transform coefficients;

performing an inverse quantization operation on said transform coefficients to scale said transform coefficients;

performing an inverse transformation process on said scaled transform coefficients to convert said scaled transform coefficients into pixel values;

adding said pixel values to motion compensated pixels retrieved from pixel memory to obtain decoded pixel values;

storing said decoded pixel values;

processing said decoded pixel values to modify said current pixel block such that said current pixel block does not require reference to said portion of said insertion window of the video signal for decoding.

20. A method in accordance with claim 19, wherein said processing of said decoded pixel values comprises:

performing a transformation process on said decoded pixel values to reproduce said scaled transform coefficients;

performing a quantization operation on said scaled transform coefficients to re-scale said transform coefficients to achieve a desired data rate; and variable length encoding of said re-scaled transform coefficients to provide an intra coded pixel block in place of said current pixel block at said desired data rate.

21. A method in accordance with claim 19, wherein said processing of said stored decoded pixel values comprises:

performing a motion compensation operation on said stored decoded pixel values to reconstruct the obscured region of the video signal;

performing a transformation process on said motion compensated pixel values to reproduce said scaled transform coefficients;

performing a quantization operation on said scaled transform coefficients to re-scale said transform coefficients to achieve a desired data rate; and variable length encoding of said re-scaled transform coefficients using new motion vectors to provide a modified pixel block in said video signal in place of said current pixel block at said desired data rate.

22. A method in accordance with claim 1, wherein said insert processing mode comprises:

variable length decoding of said insertion window portion of said video signal to provide quantized transform coefficients;

performing an inverse quantization operation on said transform coefficients to scale said transform coefficients;

performing an inverse transformation process on said scaled transform coefficients to convert said scaled transform coefficients into pixel values corresponding to said insertion window portion;

adding said pixel values to motion compensated pixels retrieved from pixel memory to obtain decoded pixel values;

storing said decoded pixel values corresponding to said insertion window portion;

combining pre-stored pixel values corresponding to said overlay content with at least a portion of said stored decoded pixel values corresponding to said insertion window portion to provide modified decoded pixel values;

performing a transformation process on said modified decoded pixel values to provide modified scaled transform coefficients;

performing a quantization operation on said modified scaled transform coefficients to re-scale said modified transform coefficients to achieve a desired data rate; and variable length encoding of said re-scaled modified transform coefficients to provide said modified video signal at said desired data rate.

23. A method in accordance with claim 22, wherein said pre-stored pixel values corresponding to said overlay content are obtained by:

variable length decoding of said overlay content signal to provide quantized transform coefficients corresponding to said overlay content;

performing an inverse quantization operation on said transform coefficients corresponding to said overlay content to scale said transform coefficients;

performing an inverse transformation process on said scaled transform coefficients to convert said scaled transform coefficients into pixel values corresponding to said overlay content; and storing said pixel values corresponding to said overlay content.

24. A method in accordance with claim 15, further comprising transitioning from said normal processing mode to the insert processing mode when inserting said overlay content into said video signal.

25. A method in accordance with claim 24, wherein said transitioning comprises:

waiting to receive an I-frame in said video signal;

switching from said normal processing mode to said limited processing mode;

waiting to receive a next reference frame in a current portion of said video signal;

setting a window-mode to on enabling an insertion window in said video signal; and switching to said insert processing mode when processing a region of the video signal corresponding to the insertion window; and switching to said obscured processing mode when processing regions of said video signal external to said insertion window portion if motion vectors corresponding to said external regions reference the insertion window portion in a previously decoded frame.

26. A method in accordance with claim 15, further comprising transitioning to said normal processing mode after completing an insertion of overlay content.

27. A method in accordance with claim 26, wherein said transitioning comprises:

waiting to receive a reference frame;

setting a prime-mode to on initiating a resetting of a memory used to process said reference frame;

setting a window-mode to off to prevent creation of an insertion window in a current portion of said video signal;

waiting for a next frame of said video signal;

determining if said next frame is a B-frame;

if said next frame is a B-frame:

setting said window-mode to on enabling said insertion window in said video signal; and waiting for further frames after said next frame until a next reference frame is received;

if said next frame is a reference frame:

setting said window-mode to off;
setting said prime mode to off; and
switching to said normal processing mode.

28. A method in accordance with claim 17, further comprising:
providing a pixel combiner;
providing a first multiplexer for selecting at least one of said transform coefficients from said inverse quantization operation or a signal from said pixel combiner; and
providing a second multiplexer for selecting at least one of said pixel errors from said quantization operation or said signal from said pixel combiner.

29. A method in accordance with claim 28, wherein said signal from said pixel combiner comprises at least one of stored overlay content pixels or main video content pixels obtained from processing of said video signal.

30. A method in accordance with claim 28, further comprising:
providing an overlay controller for controlling at least one of said first multiplexer, said second multiplexer, said pixel combiner, and said motion compensation operation.

31. A method in accordance with claim 30, further comprising:
synchronizing operation of said first multiplexer, said second multiplexer, said pixel combiner, and said motion compensation operation.

32. A method in accordance with claim 1, wherein:
said processing of said overlay content signal and said insertion window portion of said decoded video signal to produce said modified insertion window portion of said video signal comprises:
processing said insertion window portion of said video signal to obtain a corresponding first set of absolute pixel values;
storing said first set of absolute pixel values corresponding to said insertion window portion;
processing said overlay content signal to obtain a corresponding second set of absolute pixel values corresponding to said overlay content; and
storing said second set of absolute values corresponding to said overlay content;
said modified insertion window portion is produced by processing said first and second set of absolute pixel values.

33. A method in accordance with claim 1, wherein said overlay content is inserted into said video signal in place of said insertion window portion of said video signal to produce said modified insertion window portion.

34. A method in accordance with claim 1, wherein said overlay content is blended with said insertion window portion of said video signal to produce said modified insertion window portion.

35. A method in accordance with claim 1, further comprising:
providing different overlay content in one or more overlay content signals;
appending a tag to at least one of: (a) the video signal; and (b) at least one of said one or more overlay content signals, said tag containing identifying information; and
selecting overlay content for said inserting from one of said one or more overlay content signals in accordance with said identifying information.

36. Apparatus for inserting overlay content into a video signal, comprising:
means for receiving an overlay content signal containing overlay content;
means for receiving a compressed video signal;
means for decoding said compressed video signal;
means for identifying an insertion window portion of said decoded video signal;
means for processing said overlay content signal and said insertion window portion of said decoded video signal to produce a modified insertion window portion of said video signal; and
means for processing said video signal and said modified insertion window portion to produce a compressed modified video signal;
wherein:
an insert processing mode is provided for said processing of said overlay content signal and said insertion window portion of said video signal to produce said modified insertion window portion;
an obscured processing mode is provided for processing an obscured region of said video signal in which motion vectors of a current pixel block of the video signal reference a portion of said insertion window; and
a limited processing mode is provided for said processing when said obscured processing mode and said insert processing mode are not selected.

* * * * *

UNITED STATES PATENT AND TRADEMARK OFFICE
CERTIFICATE OF CORRECTION

| | | |
|---|---|---|
| PATENT NO. | : 7,688,889 B2 | Page 1 of 1 |
| APPLICATION NO. | : 11/881366 | |
| DATED | : March 30, 2010 | |
| INVENTOR(S) | : Edward A. Krause | |

It is certified that error appears in the above-identified patent and that said Letters Patent is hereby corrected as shown below:

Column 31, line 41: "storing said second set of absolute values corresponding" should read
-- storing said second set of absolute pixel values corresponding --

Signed and Sealed this
Twenty-fifth Day of September, 2012

David J. Kappos
*Director of the United States Patent and Trademark Office*